United States Patent
Brisimitzakis et al.

(10) Patent No.: US 10,393,872 B2
(45) Date of Patent: Aug. 27, 2019

(54) CAMERA AUGMENTED BICYCLE RADAR SENSOR SYSTEM

(71) Applicant: Garmin Switzerland GmbH, Schaffhausen (CH)

(72) Inventors: Evangelos V. A. Brisimitzakis, Lenexa, KS (US); Ross G. Stirling, Cochrane (CA); Kenneth A. Carlson, Gardner, KS (US); Franz A. Struwig, Western Cape (ZA); Nolan van Heerden, Stellenbosch (ZA)

(73) Assignee: Garmin Switzerland GmbH (CH)

( * ) Notice: Subject to any disclaimer, the term of this patent is extended or adjusted under 35 U.S.C. 154(b) by 341 days.

(21) Appl. No.: 15/372,092

(22) Filed: Dec. 7, 2016

(65) Prior Publication Data
US 2017/0160392 A1   Jun. 8, 2017

Related U.S. Application Data

(60) Provisional application No. 62/264,539, filed on Dec. 8, 2015.

(51) Int. Cl.
*G01S 13/93* (2006.01)
*G01S 13/86* (2006.01)
(Continued)

(52) U.S. Cl.
CPC ............ *G01S 13/931* (2013.01); *G01S 7/003* (2013.01); *G01S 7/062* (2013.01); *G01S 7/24* (2013.01);
(Continued)

(58) Field of Classification Search
CPC .. G01S 13/931; G01S 2013/9332; G01S 7/04; G01S 7/41; B62J 2099/0013; B62J 2099/002; B62J 2099/0026; B62J 27/00
(Continued)

(56) References Cited

U.S. PATENT DOCUMENTS

| | | | |
|---|---|---|---|
| 5,005,661 A | 4/1991 | Taylor et al. | 180/219 |
| 5,781,145 A | 7/1998 | Williams et al. | 342/20 |

(Continued)

OTHER PUBLICATIONS

Printout from https://www.dcrainmaker.com/2014/07/hands-on-backtracker-radar.html; published prior to Jun. 3, 2016.
(Continued)

*Primary Examiner* — Timothy A Brainard
(74) *Attorney, Agent, or Firm* — Samuel M. Korte; Max M. Ali

(57) ABSTRACT

A bicycle radar system including a camera is disclosed. The system may include a radar unit and a bicycle computing device that are in communication with one another. The radar unit may transmit radar signals, receive return signals (reflections), and process the returned radar signals to determine a location and velocity of one or more targets located in a sensor field behind a user's bicycle. The radar unit may also include an integrated camera to selectively provide images or video of an area behind the bicycle in the camera's field of view. The radar unit may analyze the returned radar signals and images and/or video to track the location of targets located behind the bicycle. The bicycle computing device or the radar unit may also selectively activate the camera based upon the satisfaction of particular conditions.

18 Claims, 7 Drawing Sheets

(51) Int. Cl.
*G01S 7/06* (2006.01)
*G01S 7/24* (2006.01)
*G01S 7/00* (2006.01)

(52) U.S. Cl.
CPC ....... G01S 13/867 (2013.01); *G01S 2013/936* (2013.01); *G01S 2013/9353* (2013.01); *G01S 2013/9357* (2013.01); *G01S 2013/9378* (2013.01)

(58) Field of Classification Search
USPC .......................................................... 342/55
See application file for complete search history.

(56) References Cited

U.S. PATENT DOCUMENTS

| | | | |
|---|---|---|---|
| 6,731,202 B1 | 5/2004 | Klaus | 340/425.5 |
| 7,061,372 B2 | 6/2006 | Gunderson | 340/435 |
| 7,079,024 B2 | 7/2006 | Alarcon | 340/539.11 |
| 9,449,518 B2 | 9/2016 | Mochizuki | |
| 2003/0201929 A1* | 10/2003 | Lutter | G01S 7/032 342/52 |
| 2008/0186382 A1 | 8/2008 | Tauchi | 348/148 |
| 2009/0033475 A1 | 2/2009 | Zuziak et al. | 340/432 |
| 2013/0127638 A1 | 5/2013 | Harrison | 340/903 |
| 2015/0025789 A1* | 1/2015 | Einecke | G01S 13/72 701/408 |
| 2015/0228066 A1* | 8/2015 | Farb | G06K 9/00805 348/148 |
| 2016/0363665 A1 | 12/2016 | Carlson et al. | 342/146 |

OTHER PUBLICATIONS

Printout from https://www.dcrainmaker.com/2015/10/cycliq-tly6-review.html; published prior to Jun. 3, 2016.
Printout from https://www.dcrainmaker.com/2015/01/cycliq-mounted-camera.html; published prior to Jun. 3, 2016.
Printout from http://www.slowtwitch.com/Products/2011_Interbike_Cerevellum_Hindsight_35_2349.html, published prior to Jun. 3, 2016.

* cited by examiner

CAMERA AUGMENTED BICYCLE RADAR SENSOR SYSTEM

CROSS-REFERENCE TO RELATED APPLICATIONS

The priority benefit of U.S. Provisional Patent Application No. 62/264,539, entitled "Bicycle Rear Radar Sensor and Camera," filed on Dec. 8, 2015, is claimed and the disclosure of which is hereby incorporated by reference in its entirety.

TECHNICAL FIELD

The present disclosure relates generally to bicycle radar systems and, more particularly, to a bicycle radar system that is mounted to a bicycle and augmented with a camera to provide enhanced user awareness of vehicles and other cyclists located behind the bicycle radar system.

BACKGROUND

Cyclists often have limited visibility of their surroundings, particularly of moving targets (e.g., vehicles, bicycles, objects, obstacles, etc.) located behind them. Radar signals may be output and reflections of the outputted radar signals may be used to detect nearby targets in a sensor field, such as an area of interest behind the cyclist, and present information related to the detected target(s) to the cyclist. However, radar systems typically include a transmitting antenna and a radar sensor (receiving antenna) that detects one or more targets traveling near the bicycle to which the bicycle radar system is mounted. A rear-mounted radar system may detect a vehicle approaching the bicycle from behind. Radar systems mounted to a moving object may be improved by incorporating a camera having a field of view at least partially overlapping with the sensor field of the radar sensor.

SUMMARY

The present disclosure is directed to technology that encompasses a radio detection and ranging (RADAR or radar) sensor system having a radar sensor, a camera and a user interface device to provide situational awareness indicators. In embodiments, the radar sensor system includes a radar unit including a radar sensor housing that is mountable to the bicycle and that encloses, wholly or partially, the radar sensor, the camera, a processor, and a transceiver. The radar unit may be mounted on a bicycle in a position such that a portion of the radar sensor faces an area behind the bicycle. The radar unit may be configured to transmit radar signals, receive a reflection of the transmitted radar signals, and output radar sensor signals corresponding to the received reflections. The radar sensor signals may be analog signals indicating unprocessed measurements of radar reflections (radar beam returns) received by the radar sensor in a sensor field of the radar unit. The camera's field of view at least partially overlaps with the sensor field of the radar sensor. For instance, the sensor field of the radar sensor may be associated with an area having a size (width, height, and depth) that is approximately equal to the area of the sensor field. The camera generates images and/or video data for the field of view captured by the camera (hereafter called the "video data," the "image data" or both).

In embodiments, the radar sensor system includes a mobile electronic device (e.g., a bicycle computer, smart phone, smart watch, head-mounted in-sight display, portable navigation device, or the like). The mobile electronic device may be mounted to the bicycle or worn by the user (e.g., head-mounted, wrist-worn, etc.) in a position such that its display is viewable by the cyclist. For example, the mobile electronic device may be mountable to or sized to fit within a holder mounted to the user's bicycle, such as the handle bars, or to be mounted to sunglasses worn by the user.

The technology encompassed by the present disclosure may further comprise informing or alerting a cyclist of identified targets that may be of interest to the user by providing one or more situational awareness indicators on a display, using a haptic feedback element to provide one or more vibrations, or using a speaker of the mobile electronic device to provide audible feedback. The mobile electronic device may include one or more processors and the radar unit may include one or more processors. The processors may be used, independently or together, to analyze the radar sensor signals and video and/or image data in order to generate target data relating to one or more targets located in the radar sensor's sensor field and the camera's field of view. In implementations, the processor in the radar unit may identify at least one target located in a sensor field in proximity to the radar sensor using the reflected radar sensor signals and generate target data that may be wirelessly transmitted (or communicated) to the mobile electronic device. The target data may include data relating to a relative distance and velocity of one or more targets based upon radar signals and/or image analysis. As a result, the target data may include data (e.g., the relative distance and velocity of one or more targets and threat levels associated with targets) derived from one or more radar sensor signals and/or derived from one or more images captured by the camera. The processor of the mobile electronic device or the processor of the radar unit may determine information, such as situational awareness indicators, threat levels, and/or location and/or velocity information relating to one or more target(s) to aid a user with riding a cycle in areas having stationary and/or moving objects along the user's route from a starting point to a destination.

In embodiments, situational awareness information, determined based on target data, may be provided using the user interface device of the radar sensor system. In embodiments, the radar sensor system presents situational awareness information using a user interface device (e.g., a display, a speaker, haptic feedback element, etc.) of the mobile electronic device that is accessible by (e.g., viewable, audible, in contact with, etc.) the user while riding the cycle. For instance, in embodiments where the mobile electronic device is worn on a wrist of a user, the mobile electronic device may provide situational awareness information to the user using the haptic feedback element and/or the speaker either with or without presenting situational awareness information on a display device of the mobile electronic device.

The use of a camera in addition to a radar sensor enables the radar sensor system to enhance the situational awareness indicators in a manner that would not be feasible using only the reflections of radar sensor signals. For instance, live video data may be transmitted by the radar unit to the mobile electronic device, which may provide a real-time view of targets located behind the user's bicycle and live video data. The situational awareness indicators may include, for example, text, symbols, icons, highlighting, flashing colors, dimmed or brightened portions of a displayed screen or navigational information (turn arrow) presented on the display, and so forth, which are provided via a user interface of the mobile electronic device, which may include the display. In this way, the display may provide a situational awareness indicator to inform the user of the presence of a one or more targets within a detectable range of the radar sensor (and thus the cyclist), a threat level associated with the detected targets, and/or live video of the detected targets. In this manner, the cyclist has improved situational awareness to ride the bicycle using information relating to the detected target, which may be in front of the cyclist, behind the cyclist, or to the left or right side of the cyclist. In some implementations, the situational awareness indicators may be paired with other information (e.g., guidance, positioning, or location information).

The situational awareness information presented on the display may include a determined location of a detected target (e.g., an approaching vehicle, pedestrian, cyclist, object, animal, other cyclist, etc.) relative to the bicycle based on a received radar sensor signal, a determined range of the target to the cyclist, a direction of approach of the target, a determined awareness level of the target, a threat level, a current lane occupied by the target, and so forth. For example, a situational awareness indicator may be a tracking bar with an icon illustrative of a target location based on received target data, a dynamic representation of a distance between the target and the bicycle using two icons, a brightness or color of an edge of the display or navigational information (turn arrow) presented on the display, or a numeric time gap between the target and the bicycle based on the target data. In embodiments, the mobile electronic device can also present location information or positioning data (e.g., geographic coordinates, altitude, map data, navigation information, and so forth) based on a current geographic position received by the processor from a position-determining component located within the mobile electronic device or the radar unit. Furthermore, the mobile electronic device may present threat level indicators or video of the road behind the bicycle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

Figure 1:
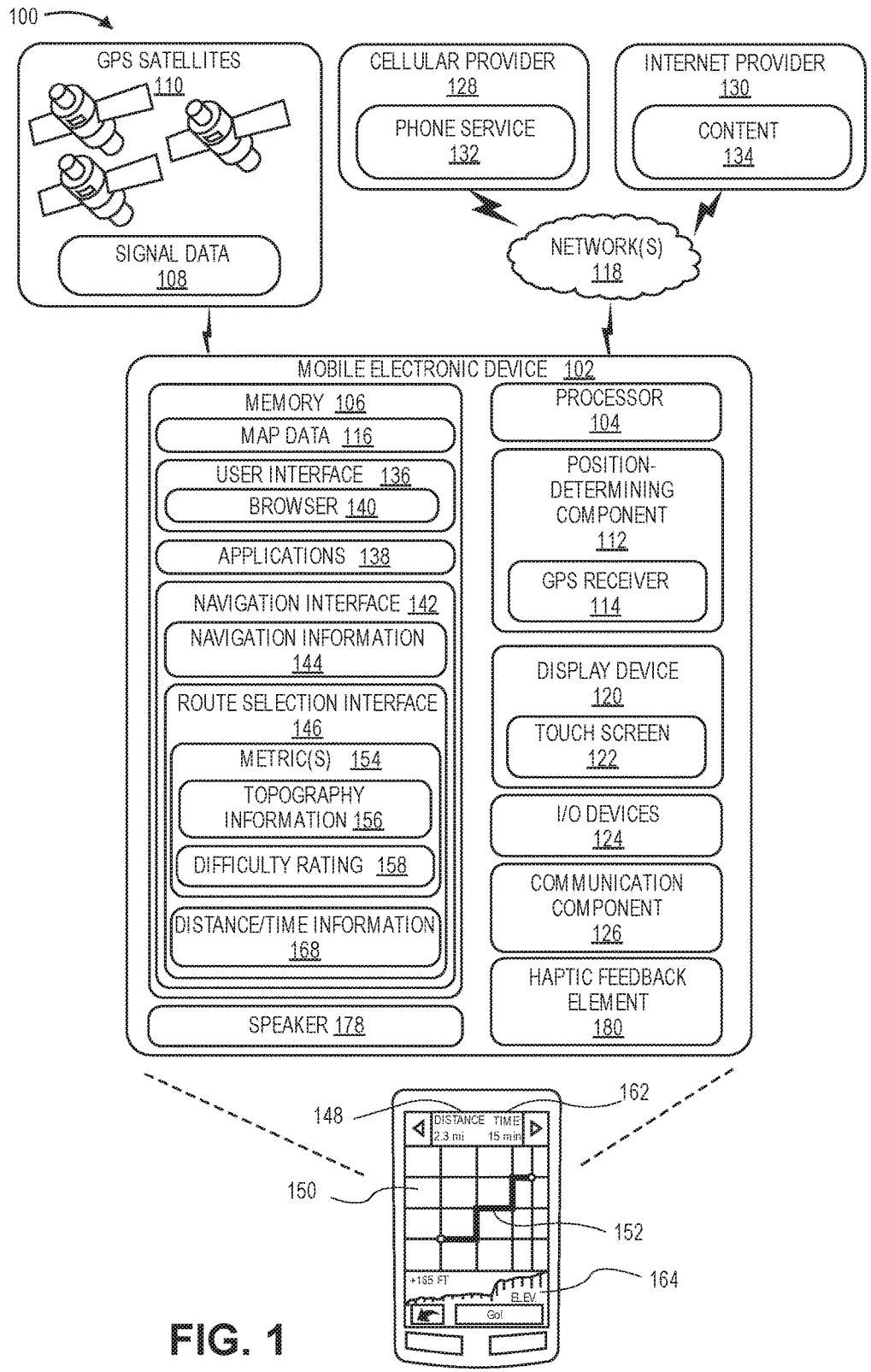
FIG. 1 is a block diagram illustrating an example mobile electronic device environment 100 including a mobile electronic device that can implement a radar sensor system in accordance with embodiments of the technology.

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

A radar sensor system can inform or alert a cyclist about targets, obstacles, and other objects in proximity to his or her bicycle. For clarity, while the term "bicycle" is used throughout the description for consistency and simplicity, the present invention should not be construed to be limited to use with a bicycle. Embodiments could include a bicycle, unicycle, tricycle, or any other human force-powered vehicle. A cyclist who is assisted by a bike computer, having a geographic positioning system (GPS) receiver and a processor configured to provide information. In these scenarios, situational awareness of nearby moving vehicles and bicycles may be helpful for the cyclist to identify an appropriate moment to perform a turn or lane change. In embodiments, situational awareness indicators may be presented on a display viewable by the cyclist or the situation awareness information may be provided using a haptic feedback element or a speaker of the mobile electronic device. For example, a mobile electronic device that is mounted on the handle bars of the bicycle may include a display viewable by the cyclist that can present situational awareness information (e.g., an indication of determined location(s) of a target(s), the range of the target to the cyclist, the direction of approach of the target, the awareness level of the target, and so forth) based on target data corresponding to identified targets located proximate to the bicycle. In embodiments where the radar sensor system is implemented as two or more separate components, the target data is received by the mobile electronic device from a transceiver of the radar unit mounted to the bicycle. In embodiments, the mobile electronic device may be worn on a user's head or mounted to sunglasses worn by the user. Various measurements determined from an analysis of the target data may be provided to a user. The display of the mobile electronic device may also present location information (e.g., geographic coordinates, altitude, and so forth) of the bicycle based on the current geographic position of the bicycle communicated to the processor from a position-determining component.

Embodiments also include utilizing image analysis to provide additional functionality that would not be feasible for a processor by relying solely upon reflections of the radar sensor signals. For instance, a processor included in the radar unit may analyze video and/or image data to correlate one or more targets located behind the user's bicycle to a particular road lane and present this information on a display. Furthermore, although the velocity and position of various targets may be ascertained using reflections of radar sensor signals, different vehicles may have similar radar profiles regardless of their size. However, by analyzing the video and/or image data, the size a target may be readily ascertained and the appropriate threat level (which may be based upon the detected size and/or position of the target) may be conveyed to the cyclist for improved situational awareness.

In embodiments, the mobile electronic device and/or radar unit may include a position-determining component, such as a global positioning system (GPS) receiver, configured to determine a current geographic position of the bicycle, a transceiver configured to receive target data from a transceiver coupled with a radar sensor of the bicycle, a display, and a processor coupled with the position-determining component, the transceiver, and the display. The processor of the mobile electronic device may be configured to cause the display to determine one or more situational awareness indicators based on the received target data and to cause the display to present location information based on the geographic position determined by the position-determining component and the one or more situational awareness indicators (e.g., an indication of a detected target, a range of the target to the cyclist, a direction of approach of the target, an awareness level, and so forth). Additionally, the mobile electronic device may present a threat level associated with various targets, a current lane occupied by one or more targets, and/or live video captured behind the bicycle.

In some embodiments, the radar sensor system may be implemented as two or more separate components, while in other embodiments the radar sensor system may be integrated as a single component. For instance, the radar sensor system may include a radar unit (or radar housing) containing a radar sensor and a mobile electronic device having a processor configured to present situational awareness indicators informing or alerting a cyclist of one or more targets, such as moving vehicles, pedestrians, cyclists, and/or other obstacles, determined to be in proximity to his or her cycle (e.g., bicycle, unicycle, tricycle, or other human force-powered vehicle). The radar sensor may be configured to transmit a radar signal, receive a reflection of the transmitted radar signal, and output a radar sensor signal corresponding to the received reflection. The radar sensor signal may be generated by the processor of the radar unit or the radar sensor. For instance, the radar sensor signal may be an analog signal representing unprocessed radar reflections (radar beam returns) received by the radar sensor in a sensor field of the radar sensor.

The radar sensor may face an area proximate to (front, behind, left, right, or any combination thereof) the cycle to which the radar sensor system is mounted where radar signals may be output and reflections of the outputted radar signals from target(s) may be received (i.e., the sensor field of the radar sensor). The radar unit can detect one or more targets (e.g., vehicles, objects, pedestrians, animals, and so forth) in range of the bicycle based on reflections (radar beam returns) received by the radar sensor from one or more targets located within a sensor field of the radar sensor.

The radar sensor system may also include a camera facing a field of view proximate to (front, behind, left, right, or any combination thereof) the bicycle. Furthermore, the camera may be configured to capture video and/or images, which are analyzed by one or more processors included in the radar unit. The processor of the radar unit may then generate target data based on an analysis of the radar sensor signal and/or the captured video or images based upon the occurrence of certain conditions. In embodiments, the target data includes information identifying targets proximate to the bicycle regardless of whether the target data was generated based upon an analysis of the reflected radar sensor signals and/or the captured video or images. The radar unit may be mounted on the user's bicycle such that the radar sensor and camera face any area proximate to, such as an area to the front of, behind, left side, right side, or any combination thereof, the bicycle.

The mobile electronic device may also provide situational awareness information via audible alerts provided by a speaker. For example, the speaker may output a unique tone when at least one target is detected by the processor or output a tone for every new target detected. In embodiments, the processor may control the speaker to adjust a volume or pattern of output tones based on a determined awareness level of one or more targets. The processor may control the speaker to adjust a pattern of tones output by the speaker based on a determined direction of approach of the target. In embodiments, the speaker may include two speakers operating in stereo. The processor may control the two stereo speakers to adjust the tone's volume, pattern, or duration to provide feedback relating to a determined direction of approach of one or more targets identified by the processor. The processor may control the speaker to output one or more pre-recorded messages, such as "On your right" or "On your left," to provide a cyclist situational awareness of targets determined to be located in proximity of the user and his bicycle to which the radar sensor system is mounted.

The mobile electronic device may also provide situational awareness information using haptic feedback. The mobile electronic device may include a motor and a vibrating element that may be controlled by a processor to produce vibrations of constant or varying intensity. For instance, a processor may control the haptic feedback element to produce a vibration when at least one target is determined to exist in a sensor field of a radar sensor or a field of view of a camera (e.g., behind the cyclist) when a new target is identified by a processor in the radar unit. In embodiments, a processor may control the haptic feedback element to adjust vibration intensity (strength) or a pattern of the vibrations based on a determined awareness level of a target or a determined direction of approach of the target.

The processor of the mobile electronic device or the processor of the radar unit may analyze the target data to determine information, such as situational awareness indicators relating to one or more target(s), to aid a user with riding a bicycle in areas having stationary and/or moving objects along the user's route from a starting point to a destination. The processor of the mobile electronic device may receive detected current geographic position and target data from the position-determining component and a transceiver of the radar unit, respectively, and may be configured to determine one or more situational awareness indicators based on the target data, which may include information corresponding to targets proximate to the bicycle, and cause the display to present the location information (e.g., location or geographical position, altitude, or navigation data in text, symbols, a graphical (e.g., map) representation, or the like) and a situational awareness indicator.

The situational awareness indicator may be a tracking bar with an icon illustrative of a target location based on the target data, a dynamic representation of a distance between the target and the bicycle using two icons, a brightness or color of an edge of the display or navigational information (turn arrow) presented on the display, or a numeric time gap between the target and the bicycle based on the target data corresponding to targets proximate to the bicycle. The situational awareness indicator may include text, symbols, or an iconic or graphical representation located on or adjacent to a map, textual, or symbolic representation of location or positioning data, or any combination thereof. For example, the processor of the mobile electronic device can cause the display to present a map with an icon associated with the detected target on the map or present a tracking bar next to the map with an iconic representation of the detected target relative to the user's bicycle. The processor of the mobile electronic device can also cause the display to show text, symbols, icons, highlighting, flashing colors, dimmed or brightened portions of a displayed screen, and so forth to indicate an awareness level (e.g., "low awareness level," "moderate awareness level," or "high awareness level") associated with the detected target. Furthermore, the processor associated with the mobile electronic device may cause the display to show other indicators or information such as a threat level based upon the size and/or position of a target, live video captured by the camera of the radar unit, or an indication of a road lane occupied by the detected target.

In implementations, the processor of the mobile electronic device is configured to cause the display to present a first indicator when a detected target is determined to be in proximity (front, behind, left side, right side, or any combination thereof) to the bicycle. For example, the processor of the mobile electronic device may be configured to cause the display to present a tracking bar when a target is determined to be present within a detectable range of the radar sensor or is detected to be present within threshold proximity of the radar unit (and thus the bicycle) based on the target data. The processor of the mobile electronic device may also be configured to cause the display to present an icon illustrative of the target detected to be proximate to the radar unit on the tracking bar, when the target is determined to be present within a threshold distance from the bicycle based on the target data corresponding to targets proximate to the bicycle.

In some implementations, the processor of the mobile electronic device may be further configured to cause the display to present a dynamic representation of a distance determined by the processor between the bicycle and a target determined to be present proximate to the bicycle based on the received target data using an icon illustrative of the target and a second icon illustrative of the bicycle. The separation between the icons is representative of the distance between the bicycle and a target based on the target data corresponding to targets proximate to the bicycle. For example, the processor of the mobile electronic device may be configured to cause the display to show a substantially instantaneous or periodically updated representation of the tracking bar, where the cyclist icon and the target icon are presented closer to one another, or further away from one another, based on changes in the distance between the cyclist and the target.

In another example, the situational awareness indicator determined by the processor of the mobile electronic device is presented as a brightness or color of at least one portion of one or more edges of a display (including a display screen) to indicate an awareness level determined in association with a target determined to be present in proximity to the bicycle. The processor may be configured to cause a change in the brightness or color of an edge of a display device or navigational information (turn arrow) presented on the display of the mobile electronic device to indicate the presence of one or more targets proximate to the bicycle in an area of interest corresponding to the radar sensor's sensor field and/or the camera's field of view. Information relating to the targets may be provided in target data communicated by a transceiver of the radar unit to the processor of the mobile electronic device. For example, the processor of the mobile electronic device can cause at least one edge of the display or presented navigational information (turn arrow) to change color (e.g., change to red, yellow, or green) to indicate an awareness level (i.e., a suggested level of awareness of the cyclist's surroundings that the cyclist may wish to employ) associated with a target determined to be present (detected) proximate to the bicycle based on the target data corresponding to targets proximate to the user's bicycle.

The awareness level (as well as a threat level, when applicable) associated with a target may be determined based on one or more factors such as, but not limited to, a determined distance between the cyclist and detected target, a determined approaching speed of the target or relative speeds of the cyclist and target, a determined rate of acceleration or deceleration of an approaching target, a determined change of direction (e.g., turn, lane change, etc.) of an approaching target, a number of targets, a determined size of the target, map or route information (e.g., predicted visibility due to turns, hills, trees, and other geographic features, weather information, etc.), any combination of the foregoing, and so on, based on the target data corresponding to targets proximate to the bicycle. In some implementations, the processor of the mobile electronic device may also be configured to cause a change in brightness or color of the at least one portion of the edge of the screen of the display or navigational information (turn arrow) presented on the display in response to determining a target in a first direction associated with the edge corresponding the determined direction of the target relative to location and/or orientation of the mobile electronic device display.

The processor of the mobile electronic device may also be configured to cause a change in brightness or color of at least a portion of a second edge of the display in response to determining that a target is present in a second direction associated with the second edge based on the target data corresponding to targets proximate to the bicycle. For example, the processor may be configured to cause the right edge of the mobile electronic device display or navigational information (turn arrow) presented on the device display to change color or brightness to indicate an approaching vehicle or other target determined to be present (detected) in a right sensor field of the radar sensor and the left edge of the display to change color or brightness to indicate an approaching vehicle or other target determined to be present (detected) in a left sensor field of the radar sensor. Similarly, the processor may be configured to cause the right edge of the mobile electronic device display or navigational information (turn arrow) presented on the device display to change color or brightness to indicate an approaching vehicle or other target determined to be present (detected) in a right portion of a field of view of the camera and the left edge of the display to change color or brightness to indicate an approaching vehicle or other target determined to be present (detected) in a left portion of a field of view of the camera.

The processor of the mobile electronic device may also be configured to cause a change in brightness or color of at least a portion of multiple edges of the display or navigational information (turn arrow) presented on the display in response to determining that a target is present in a third direction associated with the associated combination of edges corresponding the determined direction of the target relative to location and/or orientation of the mobile electronic device display. For example, the processor may be configured to cause the left and right edges of the display or navigational information (turn arrow) presented on the display to change color and/or brightness to indicate an approaching vehicle or other target, the position of which is determined based on target data, located in a rear (or any other) sensor field of the radar sensor or field of view of the camera. The color and/or brightness change may be greater (increased) if a target determined to be located in the sensor field of the radar sensor or field of view of the camera is determined to be traveling faster than (approaching) the bicycle on which the radar unit and mobile electronic device are mounted than targets determined to be located in the sensor field that are determined to be traveling at the same or slower speed than the bicycle.

Similarly, in embodiments where the audible or haptic feedback is provided to communicate situational awareness information, the change in volume of the audible output and/or the intensity of the haptic feedback (vibration) may be greater (increased) if a target determined to be located in the sensor field of the radar sensor or field of view of the camera is determined to be traveling faster than (approaching) the bicycle on which the radar unit and mobile electronic device are mounted than targets determined to be located in the sensor field that are determined to be traveling at the same or slower speed than the bicycle. For example, the display color or brightness, speaker volume or haptic feedback may be changed to the highest (e.g., brightest, loudest, most intense or strongest) configuration of the display, speaker, or haptic feedback element, if a target determined to be located in the sensor field of the radar sensor or field of view of the camera is determined to be quickly approaching the radar unit and the bicycle at a rate of at least three times the current speed of the bicycle, which is determined by the processor of the mobile electronic device or the processor of the radar unit based on information provided by a position-determining component. In such a manner, the user may be informed of relevant targets (objects) proximate to the user and take precautionary or corrective measures, if necessary.

Situational awareness indicators may also include metrics associated with one or more targets determined to be present (detected) in the sensor field of the radar sensor or a field of view of the camera in the radar unit. For example, the processor of the mobile electronic device may be configured to determine a time gap associated with a determined distance between the bicycle to which the radar unit is mounted and a moving or stationary target detected in proximity to the bicycle and cause the display to present the determined time gap. In embodiments where the audible or haptic feedback is provided to communicate situational awareness information, a speaker of the mobile electronic device, or a speaker in wireless communication with the mobile electronic device, may output a message indicating the presence of a target proximate to the cyclist and a determined estimate of time until an approaching target will reach the cyclist. The mobile electronic device may identify a target approaching the radar unit (and the cyclist), and determine the time required for the target to reach the radar unit based on the current velocity of the target and the cyclist's bicycle. For instance, the processor may cause an audible signal such as, "vehicle identified fifty (50) feet behind, will reach bicycle in thirty (30) seconds."

In implementations, the processor of the mobile electronic device or the processor of the radar unit may use the target data to determine the time gap based on the distance between the bicycle and the detected target and relative speeds of the bicycle and the detected target. The processor of the mobile electronic device or the processor of the radar unit may determine current locations of the bicycle and target(s) determined to be located in the sensor field or the camera's field of view based on inputs such as, but not limited to, location information (e.g., location or positioning data measured by the position-determining component), communicated information (e.g., a communication received from the detected target), bicycle speed measurements (e.g., from a bicycle speedometer), and so forth.

The radar unit, including at least one radar sensor, is mountable to a bicycle being ridden by the user and the mobile electronic device is also mountable to the same bicycle in a position in which its display is viewable by the cyclist, to the user's wrist, or to an accessory (e.g., sunglasses) worn by the user on his head. In embodiments where the situational awareness information is presented on a display device of the mobile electronic device, it is to be understood that the mobile electronic device may be mounted anywhere as long as its display device may be seen by the user while riding the bicycle. For example, the mobile electronic device may be mountable to or sized to fit within a holder mounted to a steering assembly (e.g., handle bars) of the bicycle. In embodiments where the situational awareness information is provided using a speaker or a haptic feedback element, the mobile electronic device may not include a display or a display of the mobile electronic device does not need to be mounted in a location where it may be seen by the user while riding the bicycle. In embodiments, the mobile electronic device may be coupled with or in communication with (wired or wirelessly) headphones or a mobile device in communication with headphones such that audible information may be output to the user by the headphones. For instance, the mobile electronic device may determine situational awareness information for one or more targets determined to be in proximity to the bicycle and then cause the headphones to output audible alert tones or messages (e.g., "vehicle approaching to your right").

In some embodiments, the mobile electronic device is physically connected (e.g., wired) to one or more radar units mounted on the bicycle such that one or more radar sensors may have a sensor field in front of, behind, to the left side, and/or to the right side of the bicycle. In embodiments, the mobile electronic device may include or integrate a radar sensor. In other embodiments, a transceiver of the mobile electronic device may be configured for wireless communication with a transceiver of the radar unit.

Once a target has approached the bicycle from behind and the target begins travelling at approximately the same velocity as the user's bicycle, which may result in the threat level from the target exceeding a threshold level, the processor of the radar unit may activate a camera to capture video data of objects in a field of view of the camera to assist the cyclist assess a threat level posed by the target. Therefore, embodiments include the camera of the radar unit selectively capturing video and/or image data, which may be analyzed by the processor of the radar unit to generate the target data. In this way, the target data may include information that is based upon the radar sensor signals or the analyzed video and/or image data. In other words, the target data may include data (e.g., the relative distance and velocity of one or more targets) derived from radar sensor signals and/or data derived from images captured by the camera. Therefore, when the target data includes information based upon a video and/or image analysis of captured data, the target data may additionally or alternatively include data identifying any suitable type of information upon which the aforementioned situational awareness indicators are based (e.g., the relative distance and velocity of one or more targets). The use of a camera is also advantageous in that the size of objects may be more accurately ascertained, which may be used to calculate and display a higher threat level for larger targets. Furthermore, the radar unit may transmit live video data to the mobile electronic device, which is used by the processor of the mobile electronic device to display real-time video of targets behind the bicycle, particularly when targets pose an imminent threat to the cyclist and/or when the targets can no longer be detected via analysis of the radar sensor signals.

FIG. 1 is a block diagram illustrating an example mobile electronic device environment 100 including a mobile electronic device that can implement a radar sensor system in accordance with embodiments of the technology. The environment 100 includes a mobile electronic device 102 (e.g., a bicycle computing device such as the GARMIN™ EDGE™ bicycle computer, GARMIN™ VARIA VISION™ head-mounted in-sight display, GARMIN™ VIRB™ action camera, smart phone, smart watch, etc.) operable to provide navigation functionality to the user of the mobile electronic device 102. The mobile electronic device 102 may be configured in a variety of ways. For example, a mobile electronic device 102 may be configured for use during fitness and/or sporting activities, such a recreational and competitive bike riding. However, the mobile electronic device 102 can also comprise a sport watch, a golf computer, a smart phone providing fitness or sporting applications (apps), a hand-held GPS device, and so forth. It is contemplated that the techniques may be implemented in any mobile electronic device that includes navigation functionality. Thus, the mobile electronic device 102 may also be configured as a portable navigation device (PND), a mobile phone, a hand-held portable computer, a tablet, a personal digital assistant, a multimedia device, a media player, a gaming device, combinations thereof, and so forth. In the following description, a referenced component, such as mobile electronic device 102, may refer to one or more devices, and therefore by convention reference may be made to a single device (e.g., the mobile electronic device 102) or multiple devices (e.g., the mobile electronic devices 102, the plurality of mobile electronic devices 102, and so on) using the same reference number.

In FIG. 1, the mobile electronic device 102 is illustrated as including a processor 104 and a memory 106. The processor 104 may perform the functions described herein independent of the processors included in the radar unit or in conjunction with one or more processors included in the radar unit using wired or wireless communication to communicate information between the processors of the radar sensor system. The processor 104 provides processing functionality for the mobile electronic device 102 and may include any number of processors, micro-controllers, or other processors, and resident or external memory for storing data and other information accessed or generated by the mobile electronic device 102. The processor 104 and the one or more processors included in the radar unit may execute one or more software programs or computer-readable instructions that implement the operations described herein. The processor 104 and the one or more processors included in the radar unit are not limited by the materials from which it is formed or the processing mechanisms employed therein and, as such, may be implemented via semiconductor(s) and/or transistors (e.g., electronic integrated circuits (ICs)), and so forth.

The memory 106 is an example of device-readable storage media that provides storage functionality to store various data associated with the operation of the mobile electronic device 102, such as the software program and code segments mentioned above, or other data to instruct the processor 104 and other elements of the mobile electronic device 102 to perform the techniques described herein. Although a single memory 106 is shown, a wide variety of types and combinations of memory may be employed. The memory 106 may be integral with the processor 104, stand-alone memory, or a combination of both. The memory 106 may include, for example, removable and non-removable memory elements such as random access memory (RAM), read-only memory (ROM), Flash (e.g., secure digital (SD) card, mini-SD card, micro-SD card), solid-state disk (SSD), magnetic, optical, universal serial bus (USB) memory devices, and so forth.

The mobile electronic device 102 is further illustrated as including functionality to determine position. For example, the mobile electronic device 102 may receive signal data 108 transmitted by one or more position data platforms and/or position data transmitters, examples of which are depicted as Global Positioning System (GPS) satellites 110. More particularly, the mobile electronic device 102 may include a position-determining component 112 that may manage and process signal data 108 received from GPS satellites 110 via a GPS receiver 114. The position-determining component 112 is representative of functionality operable to determine a geographic position through processing of the received signal data 108. The signal data 108 may include various data suitable for use in position determination, such as timing signals, ranging signals, ephemerides, almanacs, and so forth.

Position-determining component 112 may also be configured to provide a variety of other position-determining functionality. Position-determining functionality, for purposes of discussion herein, may relate to a variety of different navigation techniques and other techniques that may be supported by "knowing" one or more positions. For instance, position-determining functionality may be employed to provide position/location information, timing information, speed information, and a variety of other navigation-related data. Accordingly, the position-determining component 112 may be configured in a variety of ways to perform a wide variety of functions. For example, the position-determining component 112 may be configured for bicycle navigation (e.g., implemented within a bicycle computer); however, the position-determining component 112 may also be configured for other vehicle navigation or tracking.

The position-determining component 112, for example, can use signal data 108 received via the GPS receiver 114 in combination with map data 116 that is stored in the memory 106 to generate navigation instructions (e.g., turn-by-turn instructions to an input destination or POI), show a current position on a map, and so on. Position-determining component 112 may include one or more antennas to receive signal data 108 as well as to perform other communications, such as communication via one or more networks 118 described in more detail below. The position-determining component 112 may also provide other position-determining functionality, such as to determine an average speed, calculate an arrival time, and so on.

Although a GPS system is described and illustrated in relation to FIG. 1, it should be apparent that a wide variety of other positioning systems may also be employed, such as other global navigation satellite systems (GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, and magnetometers), use of "dead reckoning" techniques, and so on.

The mobile electronic device 102 may include a display device 120 to display information to a user of the mobile electronic device 102. In embodiments, the display device 120 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display device 120 may be backlit via a backlight such that it may be viewed in the dark or other low-light environments.

The display device 120 may be provided with a touch screen 122 to receive input (e.g., data, commands, etc.) from a user. For example, a user may operate the mobile electronic device 102 by touching the touch screen 122 and/or by performing gestures on the touch screen 122. In some embodiments, the touch screen 122 may be a capacitive touch screen, a resistive touch screen, an infrared touch screen, combinations thereof, and the like. The mobile electronic device 102 may further include one or more input/output (I/O) devices 124 (e.g., a keypad, buttons, a wireless input device, a thumbwheel input device, a trackstick input device, and so on). The I/O devices 124 may include one or more audio I/O devices, such as a microphone, speakers, and so on.

The mobile electronic device 102 may also include a communication component 126 representative of communication functionality to permit mobile electronic device 102 to send/receive data between different devices (e.g., components/peripherals) and/or over the one or more networks 118. Communication component 126 may be a transceiver coupled with the processor 104. Communication component 126 may be representative of a variety of communication components and functionality including, but not limited to: one or more antennas; a browser; a transmitter and/or receiver; transceiver, a wireless radio; data ports; software interfaces and drivers; networking interfaces; data processing components; and so forth.

The one or more networks 118 are representative of a variety of different communication pathways and network connections which may be employed, individually or in combinations, to communicate among the components of the environment 100. In embodiments, networks 118 may include wireless communication between communication component 126 (transceiver) and a transceiver within the radar unit. Thus, the one or more networks 118 may be representative of communication pathways achieved using a single network or multiple networks. Further, the one or more networks 118 are representative of a variety of different types of networks and connections that are contemplated including, but not limited to: the Internet; an intranet; a satellite network; a cellular network; a mobile data network; wired and/or wireless connections; and so forth.

Examples of wireless networks include, but are not limited to, networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; ZigBee standards promulgated by the ZigBee Alliance; Bluetooth standards promulgated by the Bluetooth Special Interest Group; ANT or ANT+ standards promulgated by Dynastream Innovations, Inc.; and so on. Wired communications are also contemplated such as through universal serial bus (USB), Ethernet, serial connections, and so forth.

The mobile electronic device 102, through functionality represented by the communication component 126, may be configured to communicate via one or more networks 118 with a cellular provider 128 and an Internet provider 130 to receive mobile phone service 132 and various content 134, respectively. Content 134 may represent a variety of different content, examples of which include, but are not limited to: information relating to high-risk geographic areas (e.g., intersections, streets, etc.), map data, which may include route information; web pages; services; music; photographs; video; email service; instant messaging; device drivers; real-time and/or historical weather data; instruction updates; and so forth.

The mobile electronic device 102 is illustrated as including a user interface 136, which is storable in memory 106 and executable by the processor 104. The user interface 136 is representative of functionality to control the display of information and data to the user of the mobile electronic device 102 via the display device 120. In some implementations, the display device 120 may not be integrated into the mobile electronic device and may instead be connected externally using universal serial bus (USB), Ethernet, serial connections, and so forth. The user interface 136 may provide functionality to allow the user to interact with one or more applications 138 of the mobile electronic device 102 by providing inputs via the touch screen 122 and/or the I/O devices 124. For example, the user interface 136 may cause an application programming interface (API) to be generated to expose functionality to an application 138 to configure the application for display by the display device 120 or in combination with another display. In embodiments, the API may further expose functionality to configure the application 138 to allow the user to interact with an application 138 by providing inputs via the touch screen 122 and/or the I/O devices 124.

Applications 138 may comprise software, which is storable in memory 106 and executable by the processor 104, to perform a specific operation or group of operations to furnish functionality to the mobile electronic device 102. Example applications 138 may include bike riding applications, navigation/guidance applications, fitness applications, exercise applications, health applications, diet applications, cellular telephone applications, instant messaging applications, email applications, photograph sharing applications, calendar applications, address book applications, and so forth.

In implementations, the user interface 136 may include a browser 140. The browser 140 may enable the mobile electronic device 102 to display and interact with content 134 such as a webpage within the World Wide Web, a webpage provided by a web server in a private network, and so forth. The browser 140 may be configured in a variety of ways. For example, the browser 140 may be configured as an application 138 accessed by the user interface 136. The browser 140 may be a web browser suitable for use by a full resource device with substantial memory and processor resources (e.g., a smart phone, a personal digital assistant (PDA), etc.). However, in one or more implementations, the browser 140 may be a mobile browser suitable for use by a low-resource device with limited memory and/or processing resources (e.g., a mobile telephone, a portable music device, a transportable entertainment device, etc.). Such mobile browsers typically conserve less memory and processor resources, but may offer fewer browser functions than web browsers.

The mobile electronic device 102 is illustrated as including a navigation interface 142, which may be implemented by program instructions stored in memory 106 and executable by the processor 104. The navigation interface 142 represents functionality to access map data 116 that is stored in the memory 106 to provide mapping and navigation functionality to aid the user of the mobile electronic device 102 with traveling from a starting location to a destination. For example, the navigation interface 142 may generate navigation information 144 that includes maps and/or map-related content for display by display device 120. As used herein, map-related content includes information associated with maps generated by the navigation interface 142 and may include route information, POIs, information associated with POIs, map legends, controls for manipulation of a map (e.g., scroll, pan, etc.), street views, aerial/satellite views, and the like, displayed on or as a supplement to one or more maps. Map-related content may be retrieved from map data 116, content 134, other third party sources, or any combination thereof.

In one or more implementations, the navigation interface 142 may be configured to utilize the map data 116 to generate navigation information 144 that includes maps and/or map-related content for display by the mobile electronic device 102 independently of content sources external to the mobile electronic device 102. Thus, for example, the navigation interface 142 may be capable of providing mapping and navigation functionality when access to external content 134 is not available through network 118. It is contemplated, however, that the navigation interface 142 may also be capable of accessing a variety of content 134 via the network 118 to generate navigation information 144 including maps and/or map-related content for display by the mobile electronic device 102 in one or more implementations.

The navigation interface 142 may be configured in a variety of ways. For example, the navigation interface 142 may be configured as an application 138 accessed by the user interface 136. The navigation interface 142 may utilize position data determined by the position-determining component 112 to show a current position of the user (e.g., the mobile electronic device 102) on a displayed map, furnish navigation instructions (e.g., turn-by-turn instructions to an input destination or POI), calculate traveling distance/time information 168 (e.g., distance 148 and time 162 shown in FIG. 1), and so on.

As illustrated in FIG. 1, the navigation interface 142 further includes a route selection interface 146, which is also storable in memory 106 and executable by the processor 104. The route selection interface 146 causes the display device 120 of the mobile electronic device 102 to be configured to display route selection information. In the implementation shown, the route selection information is illustrated in the format of a map page 150 that includes a route graphic 152 representing a route that may be traversed by a cyclist using the mobile electronic device 102 (e.g., by a bicycle in or on which the mobile electronic device 102 is mounted or carried). The route selection interface 146 can also provide various metrics 154 such as topography information 156, a difficulty rating 158 associated with traversing a geographic area, elevation data 164, and so forth.

The mobile electronic device 102 is further illustrated as including functionality to provide audible and tactile (vibration-based) feedback to a user. In embodiments, the mobile electronic device 102 includes a speaker 178 and a haptic feedback element 180. Speaker 178 may be any sound producing element (e.g., speaker, headset, mono or stereo headphones, etc.). Haptic feedback element 180 may be a vibration-producing component such as a motor coupled to an eccentric load.

The mobile electronic device 102 may include the speaker 178 and haptic feedback element 180 in addition to or in lieu of display device 120. For instance, in embodiments where mobile electronic device 102 may not be mounted or worn in a position in which its display device 120 may be seen by a cyclist while riding a bicycle, speaker 178 may provide audible communication of situational awareness information determined by processor 104 to the cyclist. Similarly, haptic feedback element 180 may provide tactile communication of situational awareness information determined by processor 104 to the cyclist.

Figure 2A:
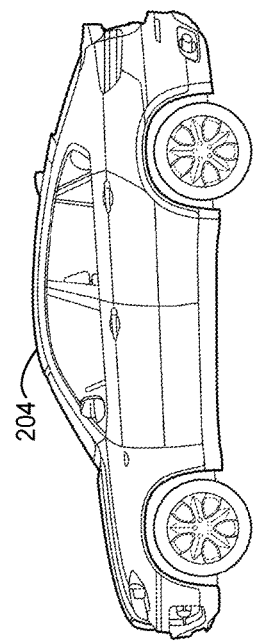
FIGS. 2A-2B illustrate an example radar sensor system environment 200 from two different perspectives.
Figure 2A:
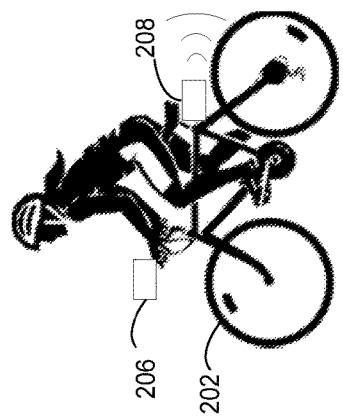
Figure 2B:
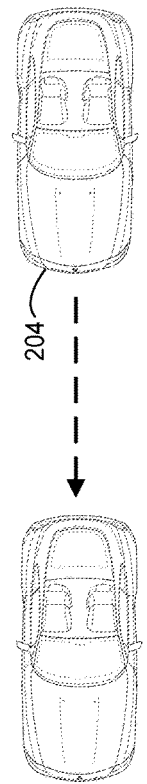
Figure 2B:
Figure 3:
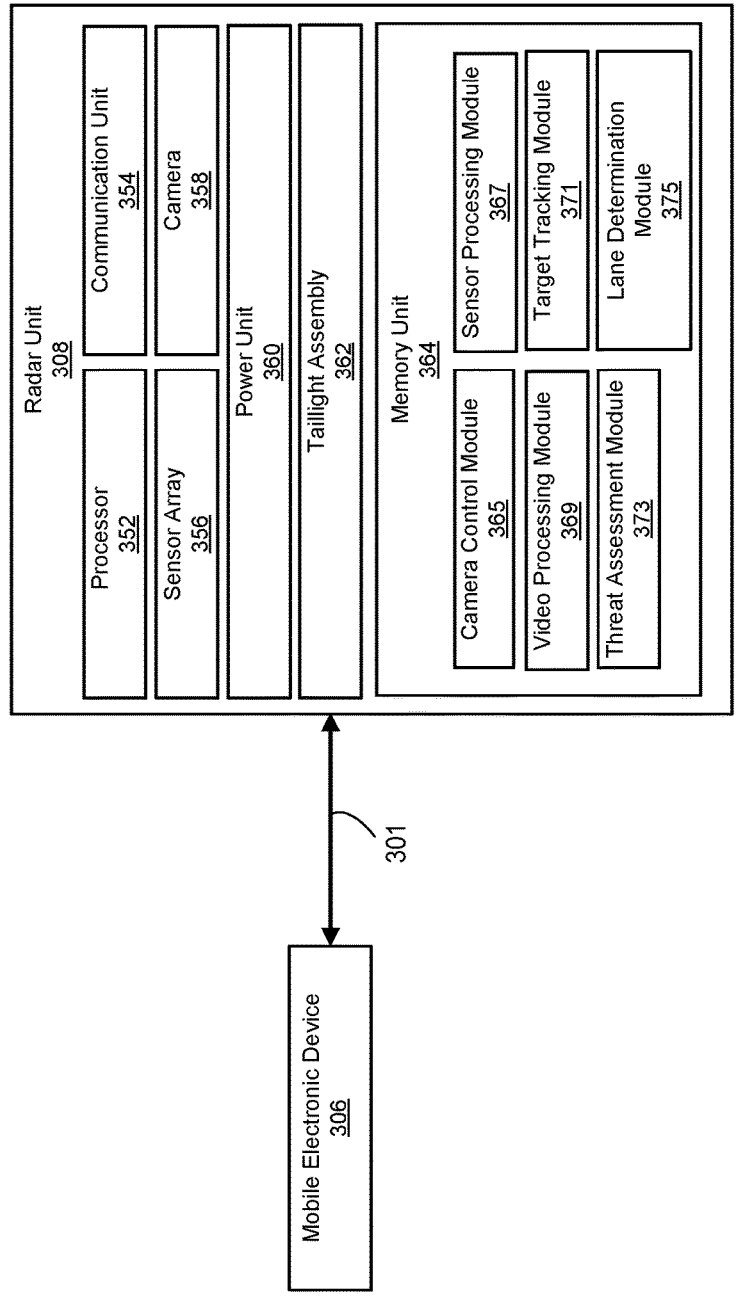
FIG. 3 is a block diagram example of a radar sensor system 300, according to an embodiment.

FIGS. 2A-2B illustrate an example radar sensor system environment 200 from two different perspectives. As shown in FIG. 2A, radar sensor system environment 200 includes a bicycle 202, to which a mobile electronic device 206 and radar unit 208 are mounted, and a target 204, which is a vehicle in this example. In an embodiment, mobile electronic device 206 may be an implementation of mobile electronic device 102, as shown in FIG. 1 and discussed above. Furthermore, in an embodiment, radar unit 208 may be an implementation of radar unit 308, as shown in FIG. 3 and discussed further below.

Although a bicycle is shown in FIGS. 2A and 2B as an example, embodiments also include bicycle computing device 206 and radar unit 208 being mounted or affixed to any suitable type of human-powered or motor-driven vehicle instead of bicycle 202. For example, mobile electronic device 206 and radar unit 208 may be mounted to a unicycle, a tricycle, a scooter, a motorcycle, a car, a forklift, etc. Furthermore, although target 204 is shown in FIGS. 2A-2B as a vehicle, embodiments include mobile electronic device 206 and radar unit 208 detecting any suitable number and/or type of targets that may pose a potential threat to the cyclist riding bicycle 202 (or alternative vehicle as the case may be). For example, target 204 may include one or more pedestrians, other cyclists, trucks, debris, etc.

Furthermore, mobile electronic device 206 and radar unit 208 are shown in FIG. 2A as being separate components. However, in some embodiments, mobile electronic device 206 and radar unit 208 may be integrated as a single component. In such a case, each of mobile electronic device 206 and radar unit 208 may be suitably mounted such that target data may be appropriately collected and information such as situational awareness indicators may be conveyed to the cyclist.

In embodiments, the mobile electronic device 206 and radar unit 208 are operable to implement the features described in accordance with radar sensor system environment 200. For example, the mobile electronic device 206 may include or be configured to wirelessly communicate with radar unit 208 (or multiple radar units). For example, radar unit 208 may include a radar sensor having a sensor field in an area proximate to the bicycle and a camera facing a field of view in the area proximate to the bicycle. The radar unit 208 may be mounted to a front, rear, or side portion of the bicycle 202 such that the sensor field and/or the camera's field of view may be directed in front of the bicycle, behind the bicycle, the right side of the bicycle, the left side of the bicycle, or any combination thereof. In embodiments, the radar unit 208, the radar sensors, the mobile electronic device 206, or portions of each of these devices may be built into another device. The radar unit 208 may also be a standalone device having a transceiver enabling wireless communications with the mobile electronic device 206.

The mobile electronic device 206 and radar unit 208 together form a radar sensor system. This radar sensor system is operable to detect objects, vehicles, people, animals, and other targets in proximity to the bicycle 202 located within sensor fields and/or the camera's field of view to assess and/or present situational awareness indicators or recommendations to the cyclist based on target data corresponding to the objects, vehicles, people, animals, and other targets. For example, as illustrated in FIG. 2A, the radar unit 208 may be configured to identify and detect one or more targets that enter a sensor field and/or field of view behind the bicycle. For instance, upon approaching bicycle 202 from behind, target 204 may be detected by radar unit 208 based on the returns (reflections) of transmitted radar signals in a sensor field behind the bicycle 202 or based on image data or video data for a field of view captured by the camera included in the radar unit. The camera's field of view at least partially overlaps with the sensor field of the radar sensor. For instance, the sensor field of the radar sensor may be associated with an area having a size (width, height, and depth) that is approximately equal to the area of the sensor field. Target data may be generated by the processor of the radar unit 208 based on the detected target(s) 204.

The mobile electronic device 206 may be configured to wirelessly receive the target data from a transceiver within the radar unit 208, to determine a location of target 204, and to notify the cyclist of the target 204 by presenting one or more situational awareness indicators on a display (e.g., display device 120, as shown in FIG. 1). The target data may include, for example, information relating to the velocity, range, recommended awareness level, azimuth angle, threat level, or any other information corresponding to the target determined to be present in a sensor field and/or field of view proximate to the bicycle 202. The velocity or position of the detected target 204 may be used by mobile electronic device 206 to determine an appropriate situational awareness level and/or recommended course of action. Processor 104 of mobile electronic device 206 may then present the situational awareness level and/or recommended course of action to the cyclist. Further details and examples of how this information may be presented is further discussed below with reference to FIGS. 4A-4C.

As shown in FIG. 2A, the mobile electronic device 206 may be implemented as any suitable type of device configured to communicate with radar unit 208, to receive target data and/or live video data from radar unit 208, and to send data to radar unit 208 to control various functions of radar unit 208. For example, the mobile electronic device 206 may be mounted on the handlebars of bicycle 202, as shown in FIG. 2A. Thus, in an embodiment, mobile electronic device 206 may be implemented, for example, as a bicycle computing device or bicycle accessory (e.g., Garmin™ EDGE and VARIA devices) that displays information to the cyclist such as navigational data, directions, routes, traffic, advanced performance metrics, VO2 max, cycling dynamics, etc., in addition to the information that is determined using target data received from radar unit 208. Alternatively, in embodiments, the mobile electronic device may be worn on a user's head (e.g., Garmin™ VARIA VISION™ head-mounted in-sight display). In some embodiments, the mobile electronic device 206 includes a communication component 126 that is physically connected (e.g., wired) to a communication interface of the radar unit 208 (or multiple radar units 208). In embodiments, the radar sensor may be enclosed entirely or partially within the mobile electronic device 206 as a separate device or integrated with the radar unit 208.

In an embodiment, radar unit 208 may be mounted or otherwise affixed to bicycle 202 and directed behind bicycle 202. As shown in FIG. 2A, radar unit 208 may transmit radar signals (e.g., radio-frequency signals of a particular frequency or band of frequencies) in the sensor field, receive a reflection of the transmitted radar signals reflected from various targets located in the sensor field (e.g., target 204), and output a radar sensor signal corresponding to the received reflection. Continuing this example, a processor within radar unit 208 may process the radar sensor signal to generate target data indicative of the velocity and range of target 204 relative to bicycle 202. The radar unit 208 may transmit the target data to the mobile electronic device 206, which may present this information to the cyclist on a display, audibly, or using haptic feedback. Additional details regarding radar unit 108 are further discussed below.

FIG. 2B shows an alternative perspective of bicycle 202 and target 204 on a road, with target 204 in the same lane as bicycle 202. For clarity, bicycle 202 is shown in FIG. 2B without the mobile electronic device 206 or radar unit 208 that are still mounted to bicycle 202. As shown in FIG. 2B, target 204 is initially following bicycle 202 in the same lane, target 204 approaches bicycle 202, as indicated by the dashed line, and then target 204 reduces its speed to approximately the same speed as bicycle 202 to avoid a collision. In an embodiment, radar unit 208 continuously or periodically operates its radar sensor to identify the presence of one or more targets behind the user. As a result, radar unit 208 may initially generate target data indicating the range and velocity of target 204 relative to bicycle 202. Once target 204 begins travelling at approximately the same velocity as bicycle 202, the processor of radar unit 208 may activate camera to capture video data (one or more images) of target 204 because a threat level posed by target 204 may exceed a predetermined threshold level.

Embodiments enable a user to determine whether the previously identified target 204 passed bicycle 202 or turned onto another road (or is otherwise not present) or whether the previously identified target 204 is now traveling directly behind the user. Therefore, embodiments include a processor of mobile electronic device 206 and/or radar unit 208 determining, from the initial target data (i.e., the target data calculated using the radar sensor signals), that a previously identified target 204 is no longer being detected, and then begin analyzing available video and/or image data captured via a camera included in radar unit 208 to determine the relative location and velocity of target 204. If the processor of mobile electronic device 206 determines that target 204 is no longer traveling in the camera's field of view behind bicycle 202, information corresponding to target 204 may be removed from the display of mobile electronic device 206. If the processor of mobile electronic device 206 determines that target 204 is still traveling in the camera's field of view behind bicycle 202, the display of mobile electronic device 206 may present a determined range of target 204 to the cyclist, a direction of approach of the target 204, a determined awareness level of target 204, a threat level associated with 204, a current lane occupied by target 204 and other information relating to target 204.

In some embodiments, the manner in which information relating to target 204 determined to be traveling behind bicycle 202 is presented to the cyclist remains the same as when the relative location and velocity of target 204 is determined via the radar sensor signals. In other embodiments, different types of information, such as the live video and/or other information, may be communicated to mobile electronic device 206 and presented upon the target data indicating that target 204 is still traveling in the camera's field of view behind bicycle 202 or the initial target data no longer indicating the relative location and velocity of a previously identified target 204.

Furthermore, in various embodiments, the processor in radar unit 208 may perform particular functions associated with the analysis of the video and/or image data provided by the camera in radar unit 208 periodically, continuously, or upon receipt of a suitable command received from mobile electronic device 206. For example, to conserve battery power, radar unit 208 may by default analyze radar sensor signals to generate target data identifying the radar sensor as the data source used to calculate the conveyed information such as relative target position and velocity. Once the target data indicates that a target has "disappeared," mobile electronic device 206 may transmit one or more commands to radar unit 208 to activate the camera to begin capturing live video data and/or image data that may be analyzed by the processor in the radar unit 208 to calculate new target data that is transmitted to mobile electronic device 206. Of course, radar unit 208 may determine if and when to perform these functions independently (without receiving commands from the mobile electronic device 206). Further details associated with such embodiments are discussed below.

Embodiments include radar unit 208 determining information, in addition to the relative location and velocity of one or more targets, from the analysis of captured video and/or image data. For example, radar unit 208 may determine a size of target 204 by analyzing captured image and/or video data and including this information in the transmitted target data, allowing mobile electronic device 206 to present a threat level proportional to this calculated size and/or proximity of the target 204. To provide another example with reference to FIG. 2B, the processor of radar unit 208 may analyze one or more frames of the captured video to correlate target 204 to its appropriate road lane and include this information as part of the transmitted target data (or as a separate data transmission), allowing mobile electronic device 206 to display this information. The details of such operations are further discussed below.

FIG. 3 is a block diagram example of a radar sensor system 300, according to an embodiment. In an embodiment, radar sensor system 300 includes a mobile electronic device 306 and a radar unit 308. In an embodiment, mobile electronic device 306 may be an implementation of mobile electronic device 102 or mobile electronic device 206, as shown in FIGS. 1 and 2, respectively, and discussed above. Furthermore, in an embodiment, radar unit 308 may be an implementation of radar unit 308, as shown in FIG. 2 and discussed above. Again, although mobile electronic device 306 and radar unit 308 are illustrated as two separate components in FIG. 3, embodiments include mobile electronic device 306 and radar unit 308 being integrated as a single component that may be mounted in any suitable location to facilitate the functionality of both mobile electronic device 306 and radar unit 308. Regardless of whether mobile electronic device 306 and radar unit 308 are implemented as separate devices or integrated into a single device, the various components shown in FIG. 3 may be interconnected (e.g., within a single device or within each respective device) and/or coupled with one another to facilitate the various functionality described herein. Such couplings and interconnections are not shown in FIG. 3, however, for purposes of brevity.

In embodiments in which mobile electronic device 306 and radar unit 308 are implemented as separate devices, mobile electronic device 306 and radar unit 308 may be configured to communicate with one another via one or more wired and/or wireless links (e.g., link 301). This communication may include, for example, live video data and/or target data transmissions from radar unit 308 to mobile electronic device 306. To provide another example, this communication may include the transmission of one or more commands from mobile electronic device 306 to radar unit 308.

Again, to facilitate these communications, mobile electronic device 306 and radar unit 308 may be configured to support communications in accordance with any suitable number and/or type of wired and/or wireless communication protocols. Examples of suitable communication protocols may include personal area network (PAN) communication protocols (e.g., BLUETOOTH), ultra-low power communication protocols (e.g., ANT and ANT+), Wi-Fi communication protocols, radio frequency identification (RFID) and/or a near field communication (NFC) protocols, cellular communication protocols, Internet communication protocols (e.g., Transmission Control Protocol (TCP) and Internet Protocol (IP)), etc.

For example, link 301 may represent one or more wired communication links (e.g., a cable connection such as universal serial bus (USB) connection, a wired Ethernet connection, etc.) and/or one or more wireless communication links (e.g., a BLUETOOTH connection, an ANT or ANT+ connection, a Wi-Fi connection, a cellular connection, etc.) between mobile electronic device 306 and radar unit 308.

Radar unit 308 may be implemented as any suitable type of computing device suitable for being mounted or otherwise affixed to a bicycle and configured to identify one or more targets proximate to a bicycle, to generate target data indicative of the position and velocity of such targets, to capture and/or analyze image and/or video data, and to transmit target data and/or image and/or video data in accordance with the embodiments described herein. In an embodiment, radar unit 308 may include a processor 352, a communication unit 354, a sensor array 356, a camera 358, a power unit 360, a taillight assembly 362, and a memory unit 364. Radar unit 308 may include additional elements such as, for example, interactive buttons, switches, and/or knobs, memory card slots, ports, memory controllers, interconnects, etc., which are not shown in FIG. 3 or further described herein for purposes of brevity.

Processor 352 may be implemented as any suitable type and/or number of processors, such as a host processor of radar unit 308, for example. To provide additional examples, processor 352 may be implemented as an application specific integrated circuit (ASIC), an embedded processor, a central processing unit associated with radar unit 308, etc. Processor 352 may be coupled with and/or otherwise configured to communicate, control, operate in conjunction with, and/or affect operation of one or more of communication unit 354, sensor array 356, camera 358, power unit 360, taillight assembly 362, and/or memory unit 364 via one or more wired and/or wireless interconnections, such as any suitable number of data and/or address buses, for example. These interconnections are not shown in FIG. 3 for purposes of brevity.

For example, processor 352 may be configured to retrieve, process, and/or analyze data stored in memory unit 364, to store data to memory unit 364, to replace data stored in memory unit 364, to analyze reflected radar transmissions and output radar sensor signal corresponding to the received reflection, to generate target data, to capture video and/or image data, to receive commands transmitted from mobile electronic device 306, to control various functions of radar unit 308, etc. Additional details associated with such functions are further discussed below.

Communication unit 354 may be configured to support any suitable number and/or type of communication protocols to facilitate communications between mobile electronic device 306 and radar unit 308. Communication unit 354 may be configured to facilitate the exchange of any suitable type of information between radar unit 308 and mobile electronic device 306 (e.g., via link 301), and may be implemented with any suitable combination of hardware and/or software to facilitate such functionality. For example, communication unit 354 may be implemented with any number of wired and/or wireless transceivers, ports, connectors, antennas, etc. In an embodiment, communication unit 354 may function to enable radar unit 308 to wirelessly connect to mobile electronic device 306 and to provide bi-directional communications between mobile electronic device 306 and radar unit 308. The data transmitted from radar unit 308 may be referred to herein as "radar unit data," and contain the aforementioned target data as well as other types of data described throughout this disclosure (in separate data transmissions or as part of the same data transmission).

Sensor array 356 may be implemented as any suitable number and/or type of sensors configured to measure, monitor, and/or quantify one or more environmental characteristics. These sensor measurements may result in the acquisition and/or generation of different types of sensor data, for example, which may be processed by processor 352 and/or transmitted to mobile electronic device 306 via communication unit 354 as part of the target data or as a separate data transmission. Such sensor data transmissions may include, for example, processed sensor data (e.g., data indicating the actual measured values) and/or the raw sensor data output from each particular sensor, which may be processed by mobile electronic device 306 to determine the actual measured values.

For example, sensor array 356 may include one or more radar sensors and/or transducers (which may utilize, e.g., radar, Light detection and ranging (Lidar), and/or ultrasonic sensors). Sensor array 356 may include one or more radar sensors that are configured to transmit radar signals (e.g., RF signals) in various directions across a particular range of angles, to receive reflected radar signals from one or more individual radar sensors, and to output radar sensor signals using the reflected radar signals. These radar sensor signals may include, for example, analog signals that represent unprocessed measurements associated with each individual radar sensor's radar transmission and a time of return for its respective reflected radar signal. In some embodiments, the radar sensor signals may then be processed by processor 352 to determine the actual relative speed and location of one or more targets and included as part of a target data transmission.

Sensor array 356 may also include accelerometers, gyroscopes, perspiration detectors, compasses, speedometers, magnetometers, barometers, thermometers, proximity sensors, light sensors (e.g., light intensity detectors), photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, biometrics sensors (e.g., heart rate monitors, blood pressure monitors, skin temperature monitors), microphones, etc. When sensor array 356 is implemented with one or more accelerometers, sensor array 356 may utilize such accelerometers to measure the acceleration of radar unit 308 in one or more directions and, as a result, measure the acceleration of the bicycle to which radar unit 308 is mounted. This data may be utilized locally by radar unit 308, for example, to operate taillight assembly 362, as further discussed below.

In other embodiments, the target data may include the radar sensor signals as unprocessed data, and the processor of mobile electronic device 306 may analyze the radar sensor signals to calculate the actual relative speed and location of one or more targets located in the sensor field. In other words, the target data may be processed by either mobile electronic device 306 or radar unit 308 based upon considerations such as design preferences and battery and processor limitations of each device. In any event, the target data may indicate the velocity and location of various targets with respect to the velocity and location of radar unit 308. In this way, when radar unit 308 is mounted to a bicycle and directed to a region behind the bicycle, the target data indicates the location and velocity of various targets behind the bicycle with respect to the velocity and location of the bicycle.

Sensor array 356 may be configured to sample sensor measurements and/or to generate target data from radar signal reflections continuously or in accordance with any suitable recurring schedule, such as, for example, on the order of several milliseconds (e.g., 10 ms, 100 ms, etc.), once per every second, once every 5 seconds, once per every 10 seconds, once per every 30 seconds, once per minute, etc. Sensor array 356 may also be controlled via one or more commands received from mobile electronic device 306, as further discussed below.

Camera 358 may be configured to capture image data and/or video data over one or more consecutive frames, including capturing live video data, of objects in the field of view of camera 358. In an embodiment, camera 358 may selectively capture image and/or video data in response to various commands received from mobile electronic device 306 and/or upon various trigger conditions being satisfied, as further discussed herein. In an embodiment, camera 358 may be housed within or otherwise integrated as part of radar unit 308, and strategically mounted within radar unit 308 such that, when radar unit 308 is mounted in a bicycle, camera 358 may capture image and/or video data of the road and/or other objects in the field of view behind the bicycle to which radar unit 308 is mounted.

Camera 358 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality. Camera 358 may store the image and/or video data to any suitable portion of memory unit 364, which may be stored in a "rolling buffer" format such that stored data is overwritten periodically, such as every 15 minutes, every hour, etc., unless a user intervenes (e.g., by powering down radar unit 308 or indicating that video recording should be stopped using any suitable interactive techniques such as a button, which is not shown in FIG. 3 for purposes of brevity). In this way, the image and/or video data may be stored in memory unit 364 such that in the event that an accident or other noteworthy event occurs, the stored data may be saved or copied to another device as needed.

The camera's field of view at least partially overlaps with the sensor field of the radar sensor. For instance, the sensor field of the radar sensor may be associated with an area having a size (width, height, and depth) that is approximately equal to the area of the sensor field. Additionally or alternatively, camera 358 may be utilized to determine whether other components of radar unit 308 are configured properly. For example, sensor array 356 may include one or more radar sensors, which need to be mounted in such a manner that they are not obstructed to operate correctly. Because camera 358 may be mounted in close proximity to sensor array 356, an obstruction to the field of view detected by camera 358 would likely result in a similar obstruction to sensor array 356. In an embodiment, processor 352 may be configured to detect whether camera 358 has a clear field of view, for example, as part of an initial startup, initialization, or calibration procedure, and communicate this information to mobile electronic device 306 so this may be conveyed to a user. This detection may include, for example, momentarily transmitting live video data to the mobile electronic device 306 and allowing a user to view the live video data, check for obstructions, or otherwise verify that radar unit 308 has been properly aligned and mounted to the rear of the bicycle. This may also include, for example, processor 352 analyzing the live video and determining whether one or obstructions exist in the camera's field of view using any suitable image processing techniques (e.g., determining whether no images are within a threshold distance of the camera, determining that no shadows or other dark objects otherwise conceal a portion of the field of view, etc.). In the event that an obstruction is detected, mobile electronic device 306 (or radar unit 308) may sound an alarm or provide other suitable feedback to the user to verify that the alignment and mounting configuration of radar unit 308 is correct.

Power unit 360 may be configured to act as a power source for radar unit 308. Power unit 360 may be implemented as any suitable type of power source that facilitates power delivery to one or more portions of radar unit 308 to provide functionality for various components of radar unit 308. Examples of implementations of power unit 360 may include any suitable type of rechargeable battery, an array of rechargeable batteries, fuel cells, etc.

Taillight assembly 362 may be configured with any suitable number and/or type of illuminating components, such as light bulbs, light-emitting diodes (LEDs), etc., which may be arranged in a particular manner and/or have varying intensities. In an embodiment, processor 352 may control the manner in which taillight assembly 362 illuminates the various illuminating components based upon changes in acceleration of the bicycle as detected from sensor data generated by one or more accelerometers that are implemented as part of sensor array 356. For example, taillight assembly 362 may include several illuminating components positioned in a horizontal line. As deceleration is detected exceeding a threshold value, processor 352 may cause taillight assembly 362 to illuminate more illuminating components, to cause the illuminating components to increase in brightness, to flash, etc. In this way, taillight assembly 362 may function similar to a vehicle's taillights, which illuminate as the bicycle is slowing down and turn off otherwise.

In accordance with various embodiments, memory unit 364 may be a computer-readable non-transitory storage device that may include any suitable combination of volatile (e.g., a random access memory (RAM), or non-volatile memory (e.g., battery-backed RAM, FLASH, etc.). Memory unit 364 may be configured to store instructions executable on processor 352. These instructions may include machine readable instructions that, when executed by processor 352, cause processor 352 to perform various acts as described herein. Memory unit 364 may also be configured to store any other suitable data used in conjunction with radar unit 308, such as target data, sensor data, live video data, etc.

Camera control module 365 is a region of memory unit 364 configured to store instructions, that when executed by processor 352, cause processor 352 to perform various acts in accordance with applicable embodiments as described herein. In an embodiment, camera control module 365 includes instructions that, when executed by processor 352, cause processor 352 to control the state of camera 358 and/or when image and/or video data is captured, stored, and/or transmitted.

In various embodiments, processor 352 may execute instructions stored in camera control module 365 to interpret commands received from mobile electronic device 306 via link 301 and/or commands received locally, for example, in the form of user input (e.g., via appropriate interaction with radar unit 308, the details of which are not shown for purposes of brevity). For example, upon receiving one or more commands from the mobile electronic device 306, processor 352 may execute instructions stored in camera control module 365 to determine the appropriate function and to cause camera 358 to perform that function. For example, if the mobile electronic device 306 transmits a command to change the powered state of camera 358, then processor 352 may execute instructions stored in camera control module 365 to cause camera 358 to turn on or turn off in accordance with the particular command. To provide another example, processor 352 may execute instructions stored in camera control module 365 to interpret commands such as when to begin capturing image and/or video data, when to store image and/or video data in memory unit 364, when to stop the rolling buffer of image and/or video data stored in memory unit 364 and not overwrite the stored data, etc.

Sensor processing module 367 is a region of memory unit 364 configured to store instructions, that when executed by processor 352, cause processor 352 to perform various acts in accordance with applicable embodiments as described herein. In an embodiment, sensor processing module 367 includes instructions that, when executed by processor 352, cause processor 352 to analyze radar sensor signals output from one or more radar sensors included as part of sensor array 356, to determine relevant information from this analysis, and to generate target data including this determine information. For example, processor 352 may execute instructions stored in sensor processing module 367 to analyze the radar sensor signals to identify the location and/or speed of various targets located in the sensor field. This may include, for example, converting radar sensor signals collected over a time period from analog to digital signals, analyzing the time of return associated with the radar sensor signals, and correlating each radar sensor signal to a particular radar sensor in sensor array 356 to determine a size, location, and velocity of one or more targets located in the sensor field. Data processing module may then format this information as part of a target data transmission, which is then transmitted to mobile electronic device 306 via communication unit 354.

Video processing module 369 is a region of memory unit 364 configured to store instructions, that when executed by processor 352, cause processor 352 to perform various acts in accordance with applicable embodiments as described herein. In an embodiment, video processing module 369 includes instructions that, when executed by processor 352, cause processor 352 to analyze image and/or video data to determine whether one or more targets (or portions of targets) are contained in image and/or video data captured by camera 358 (field of view of camera 358).

To perform video analysis, video processing module 369 may include any suitable number and/or type of video processing algorithms. For example, memory unit 364 may be configured to store various training data models. These training data models may include, for example, ranges of video data metrics that indicate when a particular target to be detected (or a portion of a target) is contained within video data. These video data metrics may include any metrics suitable for the classification of live video data images by comparing the video data metrics to the training data models. For example, the video data metrics may indicate brightness, groupings of pixels forming specific sizes, patterns, or shapes, pixel coloration, edges detected within the live video data, contrasting portions within the live video data, etc.

Based on the output from the executed classification algorithm on the live video data, a determination may be made based upon the characteristics utilized by that particular classification algorithm. Video processing module 369 may store any suitable type and/or number of classification algorithms to make this determination. For example, video processing module 369 may store instructions that, when executed by processor 352, cause processor 352 to execute a linear classifier algorithm, a support vector machine algorithm, a quadratic classifier algorithm, a kernel estimation algorithm, a boosting meta-algorithm, a decision tree algorithm, a neural network algorithm, a learning vector quantization algorithm, etc.

Furthermore, embodiments include video processing module 369 including instructions that, when executed by processor 352, cause processor 352 to not only determine whether particular objects are located in field of view (the captured image and/or video), but the velocity and location of those objects with respect to radar unit 308. To do so, embodiments include processor 352 analyzing one or more frames of captured video to identify one or more reference objects associated with a particular fixed or known length located within the field of view of camera 358.

For example, using an edge detection algorithm or other suitable algorithm, processor 352 may identify line segments associated with dashed road lane lines. Federal guidelines establish that each dashed road lane line be 10 feet long, with the empty spaces in-between measuring 30 feet. In an embodiment, video processing module 369 may include instructions that enable processor 352 to identify such dimensions within a video frame and to calculate a proportion between pixels and the actual measurement associated with such known fixed length objects. This proportion, once known, may then be used to determine the dimensions associated with other objects (such as the targets) in the live video by applying the pixel-to-length ratio to an identified number of pixels occupied by other objects. The distance between radar unit 308 and other various targets may be calculated, for example, by identifying an object adjacent to the target having a fixed or known dimension, and applying the pixel-to-length ratio for the object to the nearby target in the field of view. Furthermore, once the dimensions of target objects are known, the velocity at which these targets are moving may be calculated, for example, using the frame capture rate associated with the captured video and the change in each target's position between each frame.

In other words, the location and velocity of targets relative to the bicycle may be determined either from an analysis of the radar sensor signal (e.g., via execution of instructions stored in sensor processing module 367 by processor 352) or from an analysis of captured video data (e.g., via execution of instructions stored in video processing module 369 by processor 352). Embodiments include radar unit 308 tracking one or more targets, i.e., providing the position and velocity of one or more targets in the target data to facilitate mobile electronic device 306 continuing to convey this information by switching between the two aforementioned analyses.

Therefore, embodiments include target tracking module 371 including instructions that, when executed by processor 352, cause processor 352 to control when each analysis is performed. Thus, target tracking module 371 is a region of memory unit 364 configured to store instructions, that when executed by processor 352, cause processor 352 to perform various acts in accordance with applicable embodiments as described herein. In an embodiment, target tracking module 371 includes instructions that, when executed by processor 352, cause processor 352 to control which source of data (i.e., radar sensor signal or video) is used to calculate the position and velocity of one or more targets included as part of the target data.

To do so, embodiments include processor 352 executing instructions stored in target tracking module 371 to determine if and when one or more trigger conditions has occurred. When a trigger condition occurs, radar unit 308 may activate camera 358, power up or power down camera 358, start or stop capturing, analyzing, and/or transmitting image and/or video data, etc. As further discussed below, processor 352 may interpret and execute various commands upon the occurrence of a trigger condition based upon the particular mode of operation of camera 358 and/or radar unit 308.

Capturing, storing, and/or transmitting video may be a particularly power-intensive operation, causing operation of camera 358 continuously to drain power unit 360. Therefore, embodiments include radar unit 308, via processor 352 executing instructions stored in target tracking module 371, to cause radar unit 308 to capture video and/or images only when certain conditions are satisfied or in specific situations. The following conditions are explained with the assumption that the radar sensor signal are collected continuously or otherwise available at any time, and the video is selectively captured, stored, transmitted, and/or analyzed. However, embodiments also encompass the opposite of this scenario. That is, embodiments may also include the video data being continuously captured and the radar sensors being selectively powered on, and the radar sensor signals being generated and/or analyzed based upon similar or identical conditions as described below. In this alternate scenario, the velocity and location of targets may be determined initially (i.e., included in the initial target data) from a video or image analysis instead of an analysis of the radar sensor signals.

Video Analysis Trigger Conditions

In various embodiments, processor 352 may execute instructions stored in target tracking module 371 to cause communication unit 352 to issue commands to camera 358 when certain trigger conditions are met, resulting in radar unit 308 activating or powering on camera 358, capturing video data, analyzing the video data, and/or transmitting the video data. In the event that video is continuously being captured, processor 352 may instead analyze the captured video upon such a condition being satisfied, as such commands are not necessary in such a scenario. Examples of various trigger conditions are further discussed below.

For example, if an analysis of the radar sensor signals does not indicate the presence of any targets in the sensor field for a predetermined threshold period of time (e.g., 30 seconds, 1 minute, etc.), then this event may serve as a video analysis trigger condition. In this way, embodiments include radar unit 308 periodically verifying, via an analysis of the video data, that no targets are located behind the bicycle.

To provide another example, embodiments include mobile electronic device 306 transmitting commands to radar unit 308 to turn on camera 358 and to analyze received live video in accordance with any suitable schedule. Alternatively, radar unit 308 may locally issue such commands independently of mobile electronic device 306. In this instance, the trigger condition may be, for example, the passage of a particular interval of time such as 15 seconds, 30 seconds, etc., such that video data is analyzed in accordance with a recurring schedule. In other words, radar unit 308 may periodically analyze captured video in addition to or as an alternative to the other trigger conditions described herein. In this way, periodic analysis of the captured video may provide additional information and feedback to a user in addition to the information obtained via an analysis of the radar sensor signals.

In an embodiment, processor 352 may analyze the radar sensor signals over a period of time as the data is received from sensor array 356. Therefore, the velocity of one or more targets as indicated by the radar sensor signals may be tracked over time as a result of processor 352 executing instructions stored in sensor processing module 367, as discussed above. This tracked velocity information may also be used as the basis of one or more trigger conditions. For example, processor 352 may execute instructions stored in target tracking module 371 to determine whether a target's deceleration profile matches (e.g., within a threshold tolerance) that of one or more predetermined deceleration profiles. In other words, upon detecting (from the radar sensor signals) that a particular target is slowing at a rate that exceeds a threshold deceleration, this may trigger processor 352 to switch how velocity and location tracking is performed for that target (or for all targets) by changing from an analysis based upon the radar sensor signals to an analysis based upon the video data, and including the results of one of these analyses as part of the target data.

To provide an additional example, instead of using the deceleration of one or more targets as a trigger condition, processor 352 may determine when one or more targets have a relative velocity that is approximately equal to that of the bicycle. That is, the condition would be said to be satisfied when it is determined that a target has a relative velocity approximately equal to that of the bicycle. To do so, processor 352 may determine when the relative instantaneous velocity of a particular target in the sensor field is less than a predetermined relative threshold velocity (e.g., 2 mph, 4 mph, etc.). If so, then this particular condition is considered satisfied, and processor 352 may switch how velocity and location tracking is performed for that target (or for all targets) by changing from an analysis based upon the radar sensor signals to an analysis based upon the video data.

As an additional example, the history or "trend" of a target's tracked velocity and/or location may also be used as the basis for one or more trigger conditions. That is, processor 352 may analyze radar sensor signals over a period of time to track the location and/or velocity of one or more targets in the sensor field. As discussed above, embodiments enable a user to determine whether the previously identified target 204 passed bicycle 202 or turned onto another road (or is otherwise not present) or whether the previously identified target 204 is now traveling directly behind the user. Using the history of tracked locations and/or velocities, processor 352 may determine when a target "should be" behind the bicycle, but its presence (i.e., its relative location) in the sensor field can no longer be detected from analysis of the radar sensor signals. For instance, using location tracking, processor 352 may track the location of a particular target from a point in time when the target is initially detected until the target passes the bicycle. In other words, once detected in the sensor field, the target is expected to pass the bicycle at some later point in time based on that target's velocity at the time it was detected. Thus, an initially detected target that is no longer detected at some later point in time using the radar sensor signals (e.g., after a time period that corresponds to when the target should have passed the bicycle based upon its initial velocity) may act as a trigger condition. When this trigger condition is met, processor 352 may switch how velocity and location tracking is performed by changing from an analysis based upon the radar sensor signals to an analysis based upon the video data (i.e., by activating camera 358 and analyzing video or image data to determine whether a target is traveling behind the user's bicycle).

To provide yet another example, embodiments include processor 352 executing instructions stored in target tracking module 371 to identify if a particular target, once detected in the sensor field, is lost within some predetermined window of time after the target's initial detection (e.g., a fixed window of time that is not based upon the target's initial velocity). For instance, if the radar sensor signals are analyzed and a target is detected in the sensor field, the location and velocity of the target may be determined and a timer or other point of reference in time (e.g., a timestamp) may be generated. If the radar sensor signals later indicate (e.g., within the next 15 seconds, 30 seconds, etc.) that the target is no longer present in the sensor field (e.g., target passed bicycle, target turned onto another road, etc.), then this particular trigger condition is satisfied for processor 352 to evaluate objects located in the field of view of camera 358. Such embodiments may be particularly important, for example, in areas where traffic often changes unexpectedly, such that video analysis may not need to be performed when traffic behind the bicycle is turning off as opposed to being behind the bicycle but no longer detected via the radar sensor signal analysis.

Regardless of how the analysis of video data is triggered, in accordance with various embodiments, radar unit 308 may continue to analyze the radar sensor signals (or do periodically such as every 5 seconds, every 10 seconds, etc.) corresponding to the sensor field while the video data corresponding to the field of view of camera 358 is analyzed. In the event that relative velocity of the target resumes above a threshold relative velocity (or another trigger condition is no longer satisfied), then radar unit 308 may switch back to analyzing the radar sensor signals to determine the relative velocity and location of one or more targets and/or cause camera 358 to power down or otherwise stop capturing, storing, and/or transmitting video.

In embodiments in which relative target velocity is used as the basis of a trigger condition, the relative velocity threshold that triggers radar unit 308 to switch from an analysis based upon the radar sensor signals to an analysis based upon the video or image data of the field of view of camera 358 may be the same value or a different value than the relative velocity threshold that triggers radar unit 308 to switch back to an analysis based upon reflections of radar sensor signals from the sensor field. For example, different relative velocity threshold values may be used such that, once a video or image data analysis is triggered, a higher relative velocity threshold is required to switch back to a radar sensor signal analysis than the initial relative velocity threshold that triggered the video or image data analysis. In this way, data analysis switching may be performed in a hysteretic manner to better ensure smooth and consistent transitions between both types of data analyses. Again, this may be facilitated, for example, by either switching data analyses (when video data is continuously captured) or by powering down camera 358 or otherwise stopping video from being captured (when the video is not continuously captured), as the case may be.

The above examples discuss situations in which the video or image data is either captured or analyzed when the radar sensor signals no longer indicate the presence of a target. This may occur when the speed of a target passed bicycle 202, turned onto another road (or is otherwise not present) or when the previously identified target 204 is now traveling directly behind the user. However, in some situations, it may be preferable to present or record live video of the field of view of camera 358 upon initially detecting a target, and then stop presenting or capturing the live video once the target has passed. Such embodiments may be particularly useful, for example, when the bicycle is traveling in an area that does not have many targets to track.

In an embodiment, the trigger condition may be based upon one or more targets having assessed a threat level in excess of a predetermined threshold. For example, as discussed further below, threat levels of targets may be based upon the determined size and/or proximity of a target to the bicycle, as well as other factors. In an embodiment, the processor of mobile electronic device 306 may determine the threat level based on an analysis of the target data. In some embodiments, the mobile electronic device 306 may determine when the trigger condition is satisfied based upon a target exceeding a predetermined threat level, and sending a command to the radar unit 308 that causes the radar unit 308 to activate camera 358 and begin capturing, analyzing, and/or transmitting video data. In other embodiments, this decision to turn on camera 358 based on the determined threat level associated with a target in the sensor field may be made independently by processor 352 of radar unit 308. In any event, processor 352 may selectively switch from determining the location and/or threat level of a target located in the sensor field relative to the bicycle using radar sensor signals to determining the location and/or threat level of a target relative to the bicycle using video data captured by the camera 358 of objects in its field of view. Again, this location and/or threat level may be included in the target data that is transmitted to the mobile electronic device, regardless of which source of data is used to determine this information.

In other words, a first trigger condition may include a target being initially detected in the sensor field via analysis of the radar sensor signals. This first trigger condition, when satisfied, may cause video to be captured, transmitted to mobile electronic device 306, stored, and/or analyzed. Furthermore, a second trigger condition may include the target passing the bicycle. This second trigger condition, when satisfied, causes the video to stop being captured, transmitted, stored, and/or analyzed. In this way, video footage may be stored over brief intervals of time when targets pose potential threats to a bicycle, and otherwise not stored permanently. This video data may be stored in memory unit 364, for example, and/or transmitted to mobile electronic device 306, which in turn presents the video data, in various embodiments. Additional details of how video data may be displayed in this manner are further discussed below.

Threat Assessment

Threat assessment module 373 is a region of memory unit 364 configured to store instructions, that when executed by processor 352, cause processor 352 to perform various acts in accordance with applicable embodiments as described herein. In an embodiment, threat assessment module 373 includes instructions that, when executed by processor 352, cause processor 352 to categorize the threat level of one or more targets located in the sensor field of sensor array 358 or field of view of camera 358. For example, as discussed above, processor 352 may execute instructions stored in video processing module 369 to track the location and velocity of targets using video data. The categorized threat level of each target may be based upon, for example, the relative location to the bicycler and/or the size of each target calculated from one or more of such video processing algorithms.

That is, embodiments include processor 352 calculating one or more dimensions of various targets in the live video (located in the field of view of camera 358). These dimensions may be any suitable portion of each target, such as those measured with respect to the front side of a vehicle (e.g., height and width). Once these dimensions are calculated, processor 352 may execute instructions stored in threat assessment module 373 to compare the dimensions to a range of predetermined dimensional models associated with various threat classifications. To provide an illustrative example, memory unit 364 may store a set of dimensional models corresponding to a large vehicle, such as a semi-truck, that represents a high threat level. Continuing this example, memory unit 364 may also store other sets of dimensional models corresponding to a sport utility vehicle (SUV), a mid-sized vehicle, and a compact vehicle, each representing a decreasing threat level in accordance with decreasing dimensions. Once the dimensions of a particular target are identified, processor 352 may correlate the target to one of these dimensional models and assess the target's threat level as the threat level of the dimensional model to which it has been correlated.

This correlation may be performed in any suitable manner. For example, processor 352 may attempt to match a calculated target dimension to a range of dimensions associated with each threat level stored in memory unit 364 (e.g., overall width or height). Processor 352 may then determine which of the stored dimensional models have a range of dimensions best matching the corresponding calculated target's dimension. Processor 352 may determine the threat level corresponding to the matched dimensional models and assess the target's threat level as the corresponding threat level.

To provide another example, threat assessment module 373 may assess threats based upon other factors in addition to, or instead of, target size. Such threat assessments may be based upon any suitable combination of information obtained by analyzing the radar sensor signals and/or by analyzing captured video data. For example, as discussed below with regards to lane determination module 375, processor 352 may correlate one or more targets to a respective road lane, and may track each target as it moves between road lanes. In an embodiment, threat assessment module 373 may include instructions that, when executed by processor 352, cause processor 352 to utilize various metrics related to road lane usage to determine potential threats. For example, the rate at which each a target changes lanes over a period of time may be compared to a threshold rate (e.g., 2 lane changes every 15 or 30 seconds, 4 lane changes within 60 seconds, etc.). Upon exceeding this threshold rate, a target may be associated with an increased threat level. To provide another example, a target that is severely skewed within its own lane or that straddles more than one lane may similarly be marked as being an increased threat level to the cyclist. To provide yet another example, the threat level may be modified in accordance with a range of predetermined distances from the bicycle, such that the target's threat level is increased the closer the target is to the bicycle, which may be in addition to the aforementioned threat assessment techniques or as an alternative to such techniques.

Furthermore, because the location and velocity of each target with respect to the bicycle may be tracked over time, a trajectory may be calculated for each target. For example, by using the previous and current velocity and heading of a particular target, this information may be extrapolated to determine a future path for that target. This extrapolation may be applied to any suitable sample size of previously tracked information (e.g., the previous 5 seconds of data, the previous 10 seconds, etc.). In various embodiments, this trajectory information may then be utilized as the basis for one or more threat assessments. For instance, if a target's trajectory, when considered in conjunction with that of the bicycle, would result in a collision (or a proximity within some threshold distance) between the bicycle and the target, then processor 352 may assess this situation as a threat to the cyclist and cause communication unit 354 to transmit this information as part of the target data (or a separate data transmission), which is then conveyed to the user via mobile electronic device 306.

To provide yet another example, processor 352 may utilize other forms of information to assess potential threats. For example, sensor array 356 may include a microphone that records audio data, which may be captured with video data or as a separate sensor measurement. Processor 352 may continuously analyze (or upon the same trigger conditions being satisfied as described herein with respect to the analysis of the video data) such audio data to determine whether a particular target should be audible to the cyclist. That is, when audio data indicates noise above a particular threshold level, then processor 352 may and cause communication unit 354 to transmit this information as part of the target data (or a separate data transmission), which is then conveyed to the cyclist via mobile electronic device 306. Such embodiments may be particularly useful, for example, to provide a third source of threat assessment should the analysis of the radar sensor signals and the video data both fail to indicate the presence of a target.

Regardless of the type of threat identified, embodiments include mobile electronic device 306 displaying various threats in any suitable manner to adequately convey to a user the severity and/or type of threat, which is further discussed below with respect to FIGS. 4A-4C.

Lane Determination

Lane determination module 375 is a region of memory unit 364 configured to store instructions, that when executed by processor 352, cause processor 352 to perform various acts in accordance with applicable embodiments as described herein. In an embodiment, lane determination module 375 includes instructions that, when executed by processor 352, cause processor 352 to correlate the target to a road lane within the road on which it is traveling. For example, as discussed above, processor 352 may execute instructions stored in video processing module 369 to track the location and velocity of targets within captured video data corresponding to a field of view of camera 358. In an embodiment, processor 352 may further execute instructions stored in lane determination module 375 to utilize one or more of these video data processing algorithms to correlate a particular target to its current road lane line.

For example, as discussed above, line segments associated with the road lane lines may be identified via edge detection (or other suitable techniques). Solid and dashed road lane lines may have pixel dimensions of a threshold size that are greater than other identified line segments within the live video data. Once the road lane lines are identified, processor 352 may execute instructions stored in lane determination module 375 to identify the shape of the road and the number of road lanes in the live video. This determination may be made, for example, using the cartographic data utilized for navigational functions performed by mobile electronic device 306 to verify the calculated number of road lanes.

Once the overall number of road lanes is determined, embodiments include processor 352 mapping or correlating the position of each target in the video to its respective road lane. Again, the cartographic data may be used to supplement or assist in this correlation, which may be received from mobile electronic device 306. For example, if a target is identified as traveling in the second lane from the right side of the road, then processor 352 may correlate this lane position to the actual map of the same road based upon the current location of mobile electronic device 306. In an embodiment, processor 352 may repeat this process over time to track each target as it moves between road lanes. That is, as each target changes between different road lanes, processor 352 may keep track of this information and transmit this data as target data (or a separate data transmission) to mobile electronic device 306. The details of how the correlated road lane line information may be displayed are further discussed below with reference to FIGS. 4A-4C.

Figure 4A:
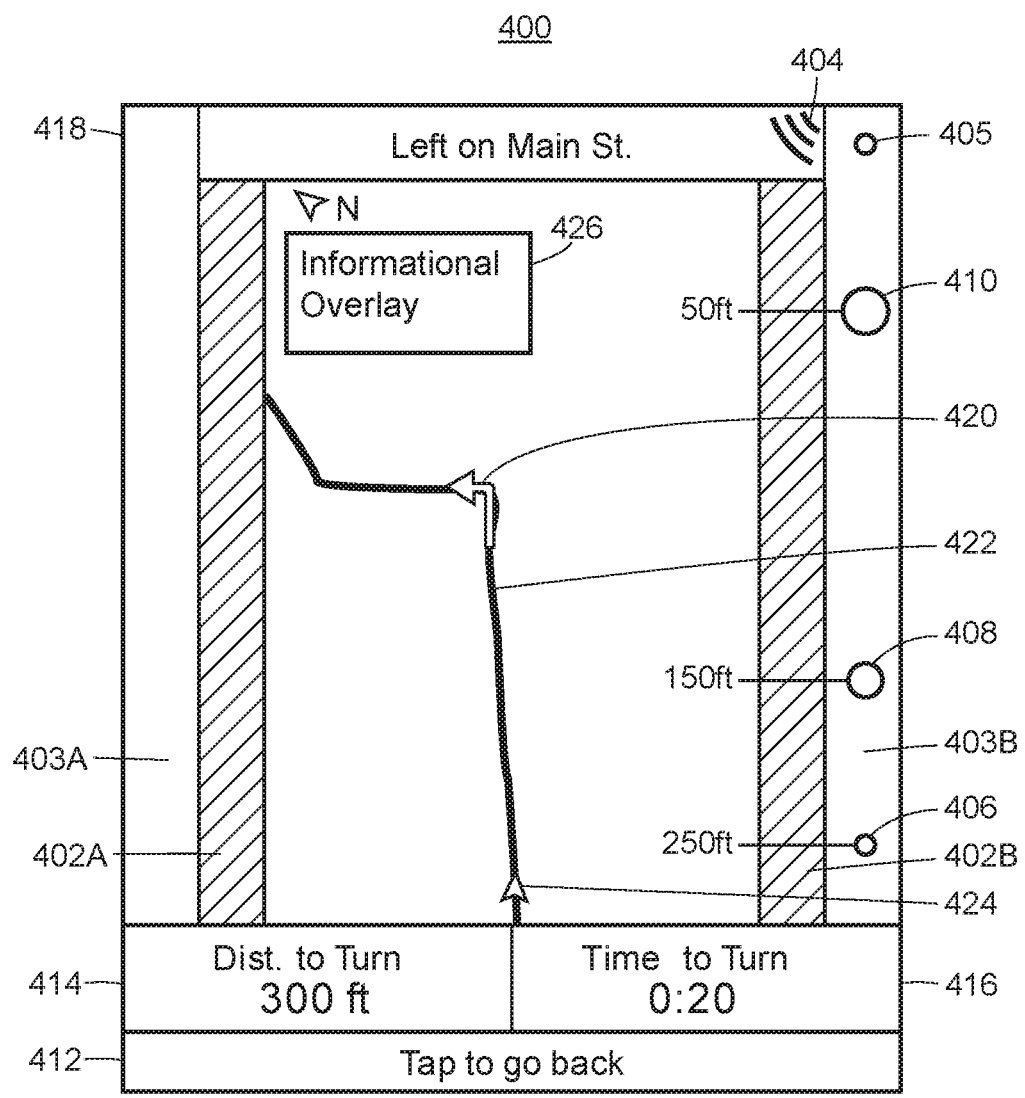
FIGS. 4A-4C are schematic illustration examples of user interface screens, according to an embodiment.
Figure 4B:
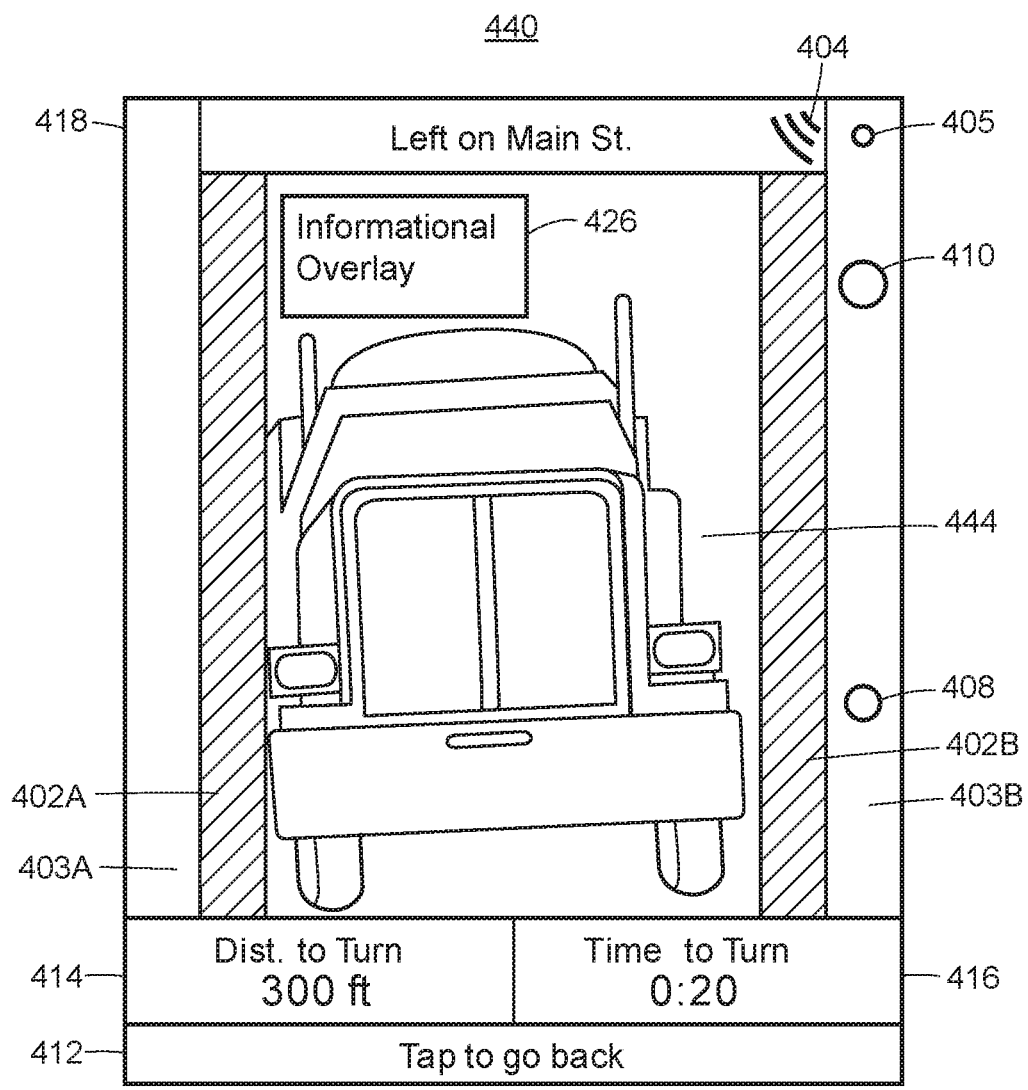
Figure 4C:
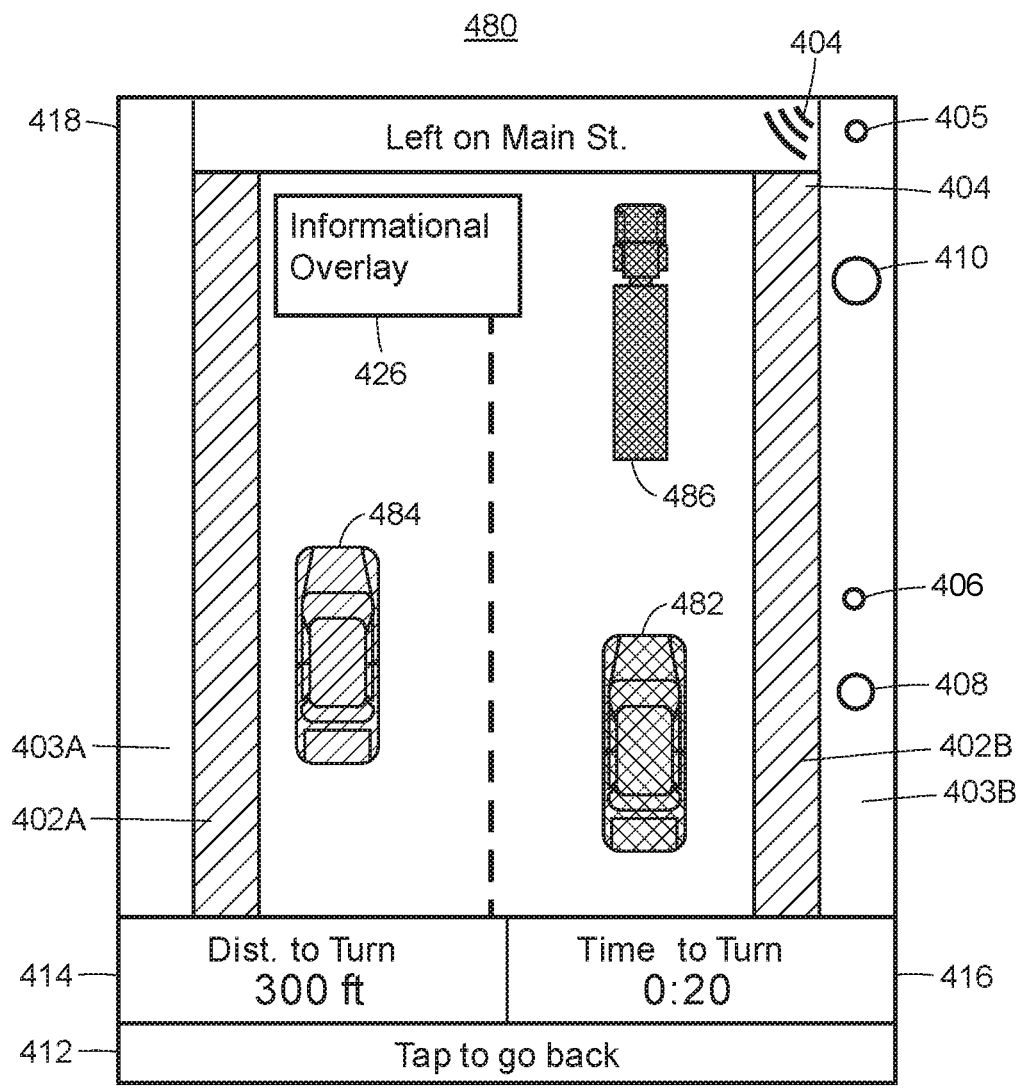

FIGS. 4A-4C are schematic illustration examples of user interface screens used in conjunction with a radar sensor system, according to an embodiment. Each of FIGS. 4A-4C shows various types of awareness indicators using the target data and/or other data received from a radar unit that is used as part of a radar sensor system. In an embodiment, FIGS. 4A-4C correspond to example displays shown by a mobile electronic device (e.g., mobile electronic device 306, as shown in FIG. 3) based on target data received from a radar unit (e.g., radar unit 308, as shown in FIG. 3).

In some implementations, processor 104 is configured to cause the display device 120 to present a route 422 and an icon 424 (e.g., triangle) indicative of the cyclist's position on the route 422, as shown in FIG. 4A. The display screen 400 may also show a street name 418, route name, or other geographic data. The processor 104 may also cause the display device 120 to show guidance information on the display screen 400. For example, the display screen 400 in FIG. 4A shows directions for the cyclist to make a left turn ahead. In some implementations, the display screen 400 may show an arrow 420 on the route 422 and a "left turn" icon in the upper left corner of the display screen 400 with a distance (e.g., 300 ft.) to the left turn (not shown). The display screen 400 illuminates the sides (e.g., edges 402A and 402B) of the display screen 400 in a low awareness color (e.g., green) or navigational information (turn arrow) presented on the display screen 400 to indicate that the determined awareness level is low at the moment or for the upcoming turn. A distance indicator 414 may also be shown to indicate that the left turn is approximately 300 feet ahead of the cyclist. A time indicator 416 may also be shown to indicate that the left turn is approximately 20 seconds ahead of the cyclist based on his or her current speed and location. Textual instructions with a street name 418 (e.g., "Left on Main St.") may be shown to guide the cyclist on the route 422. One or more navigational selections 512 (e.g., "Tap to go back") may be shown to allow the cyclist to make changes to the route or stop routing.

The display screen 400 can also show sensor connection status icon 404, indicating that the mobile electronic device 102 is wirelessly connected to the radar unit. Sensor connection status icon 404 may be presented or shaded in a color (e.g., green) to indicate connectivity. In some implementations, the first processor 104 is configured to cause the display device 120 to indicate that a wireless connection with a transceiver (within radar unit 208 or 308) coupled with one or more radar sensors is active (connected) or disconnected from the mobile electronic device 102 by changing the color or shading of sensor curves in the sensor connection status icon 404 shown on the display screen 400. In some implementations, sensor connection status icon 404 may be accompanied by a notification displayed at any suitable location on display screen 400, such as "sensor has been disconnected," or any other sort of visual or auditory indication. After a period of time, the processor 104 may be configured to cause the display device 120 to remove the notification.

In some implementations, a situational awareness indicator determined by processor 104 may include a brightness or color of at least a portion of an edge (e.g., edge 402A or 402B) of the display screen 400 or navigational information (turn arrow) presented on the display screen 400. Processor 104 is configured to cause a change in brightness or color of an edge 402A or 402B or navigational information to provide a situational awareness level to the cyclist. For example, the display screen 400 can indicate a low level of recommended awareness with a slight change in brightness or dimming of edge 402A and/or 402B, and greater changes in brightness or dimming of edge 402A and/or 402B corresponding to higher levels of recommended awareness, such as when a vehicle is rapidly approaching or near the cyclist. The display screen 400 may also indicate a low level of recommended awareness by changing a color at edge 402A and/or 402B or navigational information (turn arrow) to a low awareness color such as green, indicate higher levels of recommended awareness by changing a color at edge 402A and/or 402B or navigational information (turn arrow) to a moderate awareness color such as yellow or orange, and indicate to a highest levels of recommended awareness by changing a color at edge 402A and/or 402B or navigational information (turn arrow) to a highest awareness color such as red.

For example, processor 104 may receive target data from the radar unit (e.g., radar unit 208 or 308) indicating the position and velocity of targets relative to the bicycle (based upon an analysis of radar sensor signals or an analysis of video and/or image data, as discussed above). When this target data indicates that a target may be traveling nearby, as shown in FIG. 4A by dots 406, 408, and 410, the processor 104 may be configured to cause the display device 120 to illuminate the sides (e.g., edges 402A and 402B) of the display screen 400 or navigational information (turn arrow) presented on the display screen 400 in an awareness color (e.g., orange) corresponding to the determined threat level to indicate the awareness level.

The processor 104 may be configured to cause the display device 120 to present the tracking bar 403A and/or 403B on the display screen 400 to indicate a detected target (e.g., a rear-approaching vehicle) as one or more of the dots 406, 408, and/or 410. In various embodiments, dots 406, 408, and 410 as shown in FIG. 4A may represent three distinct targets located at different distances from the bicycle (dot 405 representing the user's location). In some embodiments, dots 406, 408 and 410 may relate to the progression of a single target as it approaches the bicycle from behind. In any event, the distance from the cyclist to the target determined to be present in a sensor field or field of view of the camera (i.e., ascertained from the target data) is represented by the position of each dot 406, 408, and 410 on the tracking bar 403B, relative to dot 405 representing the cyclist. In some embodiments, text may accompany each dot to indicate the distance of each target relative to the cyclist. Although two tracking bars 403A and 403B are shown in FIG. 4A (and FIGS. 4B-4C), embodiments include one of the tracking bars 403A or 403B being displayed at one time on display screen 400 or both tracking bars 403A and 403B being displayed at the same time. For example, tracking bar 403A may be used instead of tracking bar 403B, as shown in FIGS. 4A-4C, to display target locations according to user preference.

The dots and the accompanying text (when presented) may update periodically as new target data is received to indicate a current position of each target over time. Again, because the target data may include target distance and velocity information based upon an analysis of radar sensor signals and/or video or image data, embodiments include the position of dots 406, 408, and 410 updating regardless of the velocity at which the target is traveling. In this way, the changes in the position of each target over time may be readily and seamlessly conveyed to the cyclist in a continuous manner.

Furthermore, display screen 400 may include both awareness level indicators and/or threat level indicators based upon various factors. For example, as shown in FIG. 4A, edges 402A and 402B of the display screen 400 or navigational information (turn arrow) presented on the display screen 400 may be illuminated in a high awareness color (e.g., red) to indicate that the awareness level is high. This may be the case, for example, when the detected target represented by dot 410 is nearer to the cyclist or approaching at a faster speed than the targets represented by dots 406 and 408.

Threat level indicators may also be conveyed to the cyclist on display screen 400 in various ways. Again, the threat level of a particular target may be determined from the size of the target, the target's proximity to the cyclist, the velocity of the target, the target's trajectory, etc. In FIG. 4A, targets 406, 408, and 410 may represent three different targets behind the cyclist. As each target is nearer to the cyclist, that target's respective dot may increase in size proportional to the threat level. The size of the target's dot may also increase, for example, based upon determined size of the target based on video or image data. For example, although dot 406 is smaller than dot 410 in FIG. 4A, these dots could be the same size if the target represented by dot 406 was determined to be of a much larger size than the target represented by dot 410.

In various embodiments, processor 104 may change the appearance of dots presented in tracking bar 303A and/or 303B in any suitable manner to adequately convey the classified threat level of each target such as by changing colors, flashing, etc. Additionally or alternatively, the threat level information associated with each target (or the closest target) and/or other relevant information may be presented in an information overlay 426, as shown in FIG. 4B. For example, the information overlay 426 may display information in the form of text such as the velocity, position, and threat level classification of one or more targets (e.g., the closest target represented by dot 410), information related to the threat classification (e.g., "large vehicle approaching"), etc.

In some implementations, processor 104 is configured to cause the display device 120 to present live video data captured by the radar unit (e.g., radar unit 208 or 308) behind the cyclist, as shown in FIG. 4B. For example, display screen 440 includes the tracking bars 403A and 403B, dots 406, 408, and 410, and other similar icons and user interface functionality as display screen 400. However, instead of the map and route information previously displayed in display screen 400, as shown in FIG. 4A, the central portion 444 of display screen 400 as shown in FIG. 4B includes a screen shot of live video behind the bicycle. In this example, the live video shown in central portion 444 of display screen 440 includes that of the target corresponding to dot 410.

In an embodiment, the live video may be captured by the radar unit and transmitted to the mobile electronic device upon the radar unit receiving a command from the mobile electronic device requesting the live video. For example, as discussed above, once processor 104 determines a threat level associated with the target associated with dot 410 that exceeds a threshold threat level classification, the mobile electronic device may transmit a command to the radar unit. The radar unit may receive this command and, in response, begin capturing and transmitting live video, allowing the mobile electronic device to present the received live video, as shown in FIG. 4B. In an embodiment, once the determined threat level falls below the threshold threat level classification, display screen 440 may revert back to display screen 400. In this way, the mobile electronic device may display different types of information to a user (cyclist) based upon the threat level associated with a particular target.

In some implementations, the processor 104 is configured to cause the display device 120 to present an indication of each target within its road lane, as shown in FIG. 4C. For example, display screen 480 includes the tracking bars 403A and 403B, dots 406, 408, and 410, and other similar icons and user interface functionality as display screens 400 and 440. However, display screen 480 includes a top-down view of the road, lane dividing line, and targets traveling on the road behind the bicycle such that an indication of the tracked location of several targets relative to the bicycle is presented with the respective road lane for each target. In some embodiments, this top-down view may be presented as a particular mode of operation instead of the routing information shown in FIG. 4A. But in other embodiments, the top-down view shown in display screen 480 may be a transition from the navigational information shown in display screen 400. For example, similar to display screen 440, display screen 480 may be displayed upon the mobile electronic device detecting a threat level of a target exceeding a particular threat level classification. In such a case, display screen 480 may transition back to display screen 400 when the classified threat level falls below the classified threshold threat level.

Display screen 480 may present three targets 482, 484, and 486. Each of these targets may correspond, for example, to dots 406, 408, and 410, respectively. As shown in FIG. 4C, each target may be shaded or colored in any suitable manner to adequately convey that particular target's threat level. In the example shown in FIG. 4C, target 486 corresponds to dot 410 and is associated with the highest threat level. Target 482 corresponds to dot 408 and is associated with the next highest threat level and target 484 corresponds to dot 406 and is associated with the lowest threat level. As an illustrative example, target 486 may be displayed in red, target 482 may be displayed in orange, while target 484 may be displayed in yellow. Processor 104 may determine a higher threat level for targets 482 and 486 (than 484) because these two targets are traveling in the same lane as the user. The proximity to the user and determined size of target 486 make it a higher threat to the user than target 482. As additional target data is received indicating new lane locations and threat levels for each target, the threat level and position of each target may be determined by processor 104 and updated accordingly.

In the example shown in FIG. 4C, the size of each dot may correspond to the threat level of each target. For instance, the size of the dots may be constant, changed based upon their distance to the bicycle, or updated in size or color to match that of the threat level indicated by each target's color. In this way, different types of threats may be conveyed in different ways to the cyclist via display screen 480. For example, the size of the dots may represent a threat based upon each target's proximity to the cyclist, while each target's coloration may represent a threat level based upon the target's size or lane-changing patterns.

Figure 5:
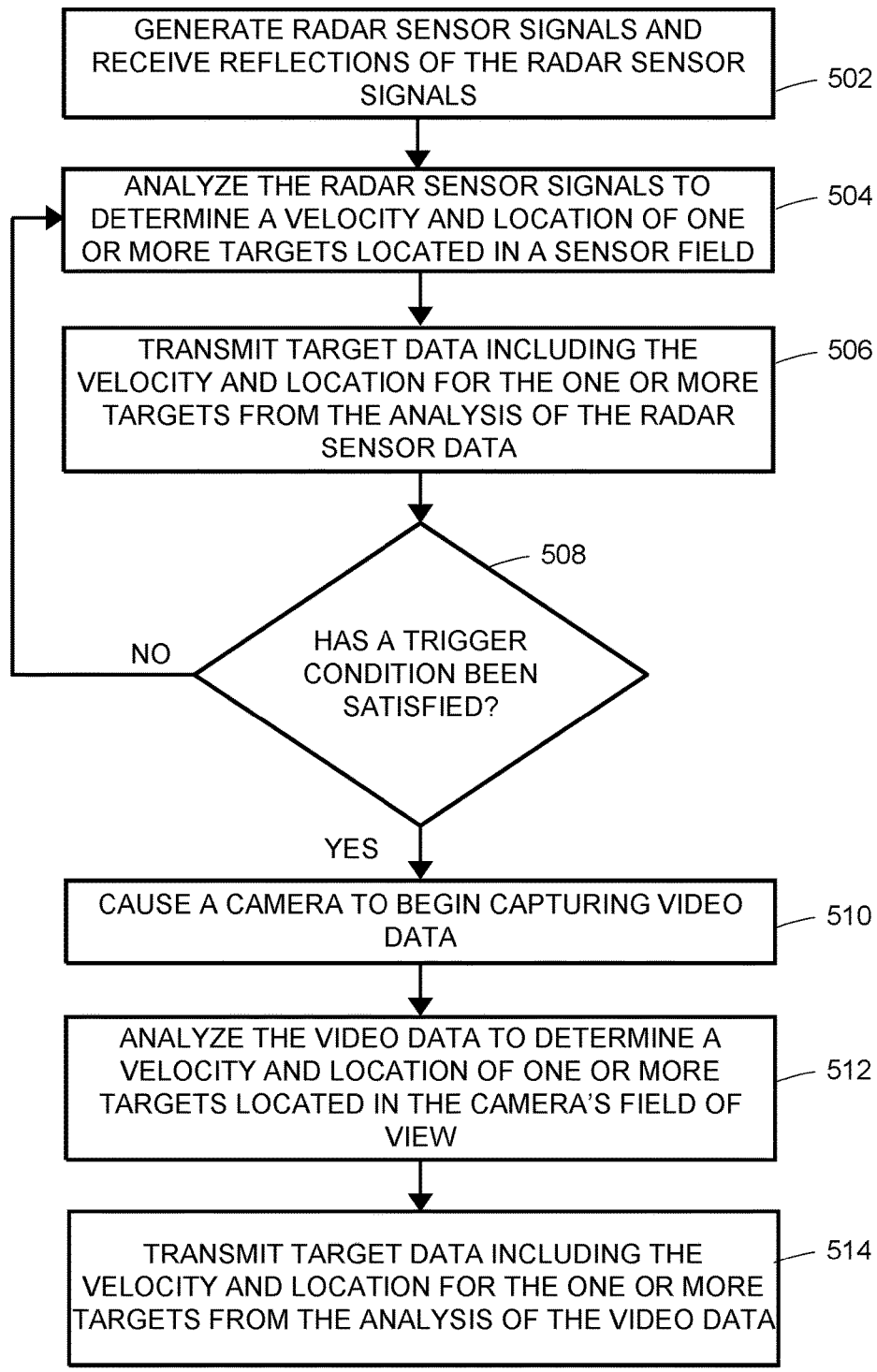
FIG. 5 illustrates a method flow 500, according to an embodiment.

FIG. 5 illustrates a method flow 500, according to an embodiment. In the embodiment, one or more regions of method 500 (or the entire method 500) may be implemented by any suitable device. For example, one or more regions of method 500 may be performed by mobile electronic device 306 and/or radar unit 308, as shown in FIG. 3.

Method 500 may begin when radar sensor signals are generated (block 502). These radar sensor signals may include, for example, radar sensor signals output from one or more radar sensors and reflected received from one or more targets located in a sensor field (block 502).

Method 500 may include one or more processors analyzing the reflected radar sensor signals to determine the velocity and/or location of one or more targets located in a sensor field (block 504). The location and/or velocity of these targets may be relative to that of the device which obtained the radar sensor signals (e.g., radar unit 308, as shown in FIG. 3) (block 504).

Method 500 may include one or more processors transmitting target data including the velocity and/or location for the one or more targets from the analysis of the radar sensor signals (block 506). This target data may be received, for example, by a mobile electronic device (e.g., mobile electronic device 306, as shown in FIG. 3), which interprets this information and presents it to a user on a display in any suitable manner. In various embodiments, upon receiving the target data, this information may be presented in accordance with the screenshots shown and described with reference to FIGS. 4A-4C.

Method 500 may include one or more processors determining whether a trigger condition has been satisfied (block 508). This may include, for example, the various trigger conditions discussed herein, such as the determination of the target being classified as a particular threat level (e.g., the threat level exceeding a predetermined threshold level), the passage of a predetermined threshold time period, the determination that a target matches a predetermined deceleration profile, the lack (absence) of any targets being detected for a particular time period based on radar sensor signals, user preference for the radar unit to utilize both the radar return signals and the video data collected by the camera, failure of the radar sensor, etc. (block 508). In embodiments, the processor may activate the camera based on a signal from a sensor array (e.g., accelerometers, gyroscopes, perspiration detectors, compasses, speedometers, magnetometers, barometers, thermometers, proximity sensors, light sensors (e.g., light intensity detectors), photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, biometrics sensors (e.g., heart rate monitors, blood pressure monitors, skin temperature monitors), microphones, etc.) exceeding a predetermined level. If the trigger condition is not satisfied, then method 500 may revert back to continuing to analyze radar sensor signals (block 504), and transmitting the target data based upon the analysis of the radar sensor signals (block 506). However, if the trigger condition is satisfied, then method 500 may continue to utilize video and/or image data to identify target(s) located in a field of view of a camera (block 510).

Method 500 may include one or more processors causing a camera to begin capturing video (block 510). This may include, for example, issuing an appropriate command to power on or otherwise control a camera, resulting in the camera capturing, storing, and/or transmitting captured video depicting objects located in the field of view of the camera (block 510).

Method 500 may include one or more processors analyzing the video data to determine a velocity and/or location of one or more targets located in the camera's field of view (block 512). This may include, for example, the analysis of the captured video (block 512) in accordance with any suitable number and/or type of video processing algorithms, as discussed herein (block 512).

Method 500 may include one or more processors transmitting (wirelessly or wired) target data including the velocity and/or location for the one or more targets determined by analyzing the video data (block 514). Again, this target data may be received, for example, by a mobile electronic device (e.g., mobile electronic device 306, as shown in FIG. 3), which interprets this information and presents it to a user on a display in any suitable manner. In various embodiments, this information may be displayed in accordance with the screenshots shown and described with reference to FIGS. 4A-4C.

Some of the Figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components. For example, any of the functionality described herein with reference to the radar unit may be performed by the mobile electronic device.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

Having thus described various embodiments of the technology, what is claimed as new and desired to be protected by Letters Patent includes the following:

1. A radio detection and ranging (radar) unit for a bicycle, comprising:
    a radar sensor configured to transmit a radar signal and receive a reflection of the transmitted radar signal, the radar sensor outputting a radar sensor signal corresponding to the received reflection;
    a camera;
    a wireless transceiver configured to transmit target data; and
    a processor coupled with the radar sensor, the camera, and the wireless transceiver, the processor configured to:
    determine a location of a target relative to the bicycle based on the received radar sensor signal,
    determine a threat level associated with the target based on the determined location of the target,
    generate the target data indicative of the location of the target relative to the bicycle and the threat level associated with the target, and
    turn on the camera based on the determined threat level associated with the target.

2. The radar unit of claim 1, wherein the processor is further configured to:
    determine a size of the target using video data generated by the camera; and
    determine the threat level associated with the target further based on the determined size of the target.

3. The radar unit of claim 1, wherein the wireless transceiver is further configured to transmit video data captured by the camera to a bicycle computing device upon the threat level associated with the target exceeding a threshold threat level.

4. The radar unit of claim 1, wherein the processor is further configured to selectively switch from determining the location of the target relative to the bicycle and the threat level associated with the target using radar sensor signal generated by the radar sensor unit to determining the location of the target relative to the bicycle and the threat level associated with the target using video data captured by the camera.

5. The radar unit of claim 4, wherein the processor is further configured to determine the location of the target relative to the bicycle and the threat level associated with the target using the video data.

6. The radar unit of claim 1, wherein the processor is further configured to cause the camera to power on and to capture video data when the processor does not determine a location of a target relative to the bicycle for a duration of time exceeding a threshold time period.

7. The radar unit of claim 1, wherein the wireless transceiver is further configured to receive a command transmitted from a bicycle computing device, and
    wherein the processor is further configured to cause the camera to power on in response to the received command.

8. A radio detection and ranging (radar) unit mountable to a bicycle, comprising:
    a radar sensor configured to transmit a radar signal and receive a reflection of the transmitted radar signal, the radar sensor outputting a radar sensor signal corresponding to the received reflection;

a camera configured to selectively capture video data behind the bicycle;

a processor coupled with the radar sensor and the camera, the processor configured to
   determine a location of a target based on the received radar sensor signal,
   determine a size of the target based on the captured video data,
   determine a threat level associated with the target based the determined location and size of the target,
   periodically generate target data indicative of the location and size of the target behind the bicycle; and a wireless transceiver coupled with the processor, the wireless transceiver being configured to transmit the target data to a bicycle computing device, wherein the target data transmitted via the wireless transceiver causes the bicycle computing device to present an indication of the tracked location of the target relative to the bicycle.

9. The radar unit of claim 8, wherein the processor is further configured to cause the camera to power off and to stop capturing video data once the determined threat level drops below a threshold threat level.

10. The radar unit of claim 8, wherein the processor is further configured to cause the camera to power on and to capture the video data when the processor does not determine a location of a target relative to the bicycle for a duration of time exceeding a threshold time period.

11. The radar unit of claim 8, wherein the wireless transceiver is further configured to receive a command transmitted from the bicycle computing device, and
   wherein the processor is further configured to cause the camera to power on in response to the received command.

12. The radar unit of claim 8, wherein the processor controls the wireless transceiver to transmit video data captured by the camera to a bicycle computing device upon the threat level associated with the target exceeding a threshold threat level.

13. The radar unit of claim 12, wherein the target data transmitted via the wireless transceiver further includes the determined threat level, and
   wherein the bicycle computing device is configured to cause a change in brightness or color of an edge of a display device in response to receiving the transmitted target data.

14. A radio detection and ranging (radar) unit mountable to a bicycle, comprising:
   a radar sensor configured to transmit a radar signal and receive a reflection of the transmitted radar signal, the radar sensor outputting a radar sensor signal corresponding to the received reflection;
   a camera configured to capture video data of a road behind the bicycle; and
   a processor coupled with the radar sensor and the camera, the processor configured to:
      determine a location of a target based on the received radar sensor signal,
      analyze the video data to identify road lane markers within the road and a current road lane of a target behind the bicycle,
      determine a size of the target based upon the analysis of the video data,
      classify the target with a threat level proportional to the determined size of the target, and
      generate target data indicative of the determined location of the target and the identified current road lane occupied by the target behind the bicycle, the target data including the classified threat level; and
   a wireless transceiver coupled with the processor, the wireless transceiver being configured to transmit the target data to a bicycle computing device to cause the bicycle computing device to present an indication of the identified location of the target in the identified road lane.

15. The radar unit of claim 14, wherein in response to receiving the transmitted target data, the bicycle computing device presents an indication of the tracked location of the target relative to the bicycle in the target's correlated road lane within the road.

16. The radar unit of claim 14, wherein the processor is configured to cause the camera to power off and to stop capturing video data once the determined threat level drops below a threshold threat level.

17. The radar unit of claim 14, wherein the processor is configured to identify the location of the target using the video data.

18. The radar unit of claim 14, wherein:
   the target is from among a plurality of targets;
   the processor is further configured to analyze the video data to correlate each of the plurality of targets to a respective road lane; and
   in response to receiving the transmitted target data, the bicycle computing device presents an indication of the tracked location of each of the plurality of targets relative to the bicycle in each target's respective road lane.

* * * * *